(12) United States Patent
Greenspan et al.

(10) Patent No.: US 9,396,120 B2
(45) Date of Patent: Jul. 19, 2016

(54) ADJUSTABLE OVER-RESTRICTIVE CACHE LOCKING LIMIT FOR IMPROVED OVERALL PERFORMANCE

(71) Applicants: Daniel Greenspan, Jerusalem (IL); Supratik Majumder, Bangalore (IN)

(72) Inventors: Daniel Greenspan, Jerusalem (IL); Supratik Majumder, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/580,570

(22) Filed: Dec. 23, 2014

(65) Prior Publication Data

US 2016/0179681 A1 Jun. 23, 2016

(51) Int. Cl.
*G06F 12/00* (2006.01)
*G06F 12/08* (2016.01)

(52) U.S. Cl.
CPC .... *G06F 12/0864* (2013.01); *G06F 2212/1021* (2013.01); *G06F 2212/6082* (2013.01)

(58) Field of Classification Search
CPC ............... G06F 12/0864; G06F 2212/1021; G06F 2212/6082
See application file for complete search history.

(56) References Cited

U.S. PATENT DOCUMENTS

| 6,047,358 | A | * | 4/2000 | Jacobs | G06F 12/126 711/128 |
| 2001/0052053 | A1 | * | 12/2001 | Nemirovsky | G06F 9/546 711/138 |
| 2013/0191600 | A1 | * | 7/2013 | Kuesel | G06F 13/28 711/136 |
| 2014/0181375 | A1 | * | 6/2014 | Miyamoto | G06F 12/0868 711/103 |

* cited by examiner

*Primary Examiner* — John Lane
(74) *Attorney, Agent, or Firm* — Lowenstein Sandler LLP

(57) ABSTRACT

Disclosed is a cache locking system that includes a cache controller that is operable to receive a first request from a device to lock a first way in the cache. The cache controller is operable to determine that the first way in the cache is not lockable by the device. The cache controller is also operable to send, to the device, a rejection of the first request. The cache controller is further operable to receive a second request from the device to lock a second way in the cache. The cache controller is operable to lock the second way in the cache in response to the second request.

20 Claims, 13 Drawing Sheets

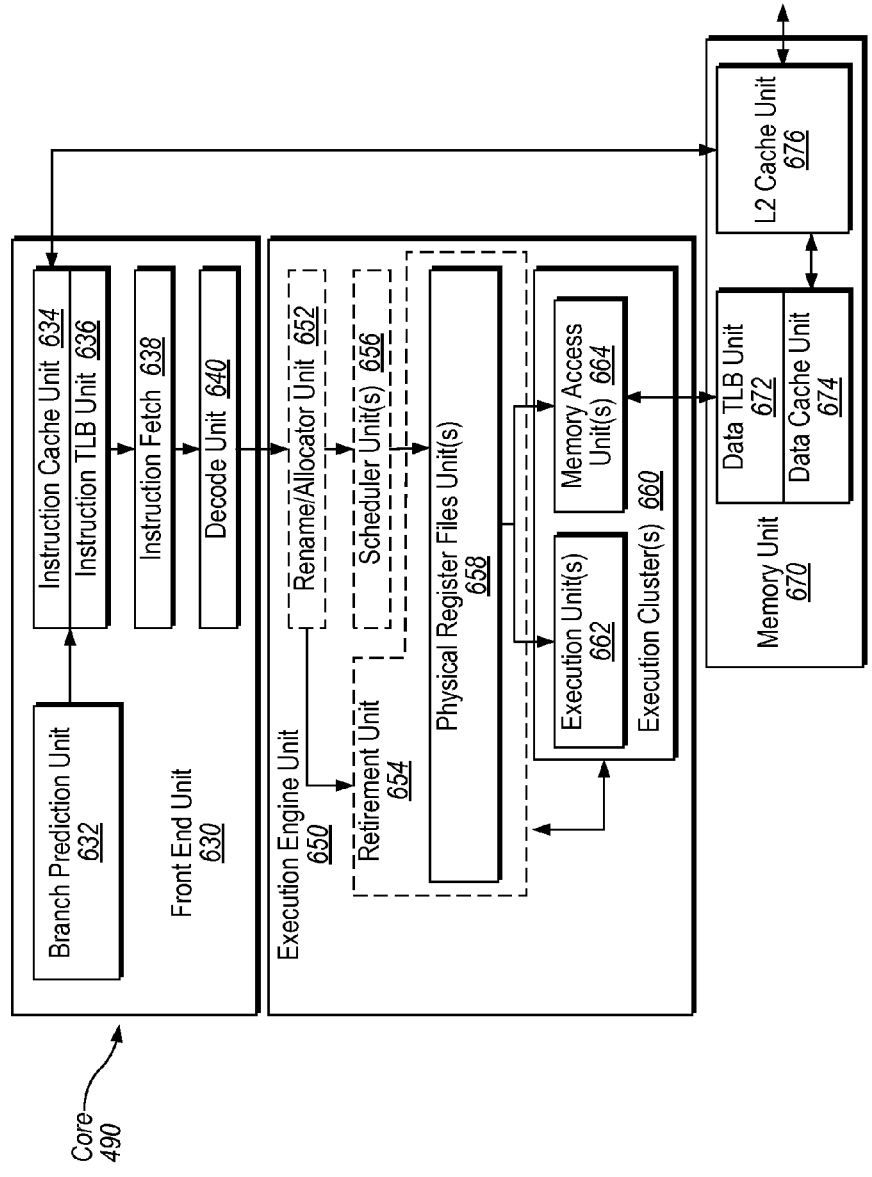
FIGURE 6A
FIGURE 6B

ADJUSTABLE OVER-RESTRICTIVE CACHE LOCKING LIMIT FOR IMPROVED OVERALL PERFORMANCE

The present disclosure generally relates to information processing and, more specifically, relates to locking ways in a set-associative cache.

BACKGROUND

A cache is a computer component that transparently stores data such that future requests for that data can be provided faster. Data stored in a cache can be unique values that have been computed earlier or duplicates of original values that are stored elsewhere, such as in a far-memory. If requested data is in the cache, this request can be handled by reading the cache, which is comparatively faster than reading far-memory. Otherwise the requested data is fetched from its original storage location. Thus, requests for data that is in the cache that can typically be handled faster than for data that is not in the cache.

BRIEF DESCRIPTION OF THE DRAWINGS

The present disclosure is illustrated by way of examples, and not by way of limitation, and may be more fully understood with references to the following detailed description when considered in connection with the figures.

FIG. 6A illustrates elements of a processor micro-architecture according to some embodiments.

FIG. 6B illustrates elements of a processor micro-architecture according to some embodiments.

DETAILED DESCRIPTION

Figure 1A:
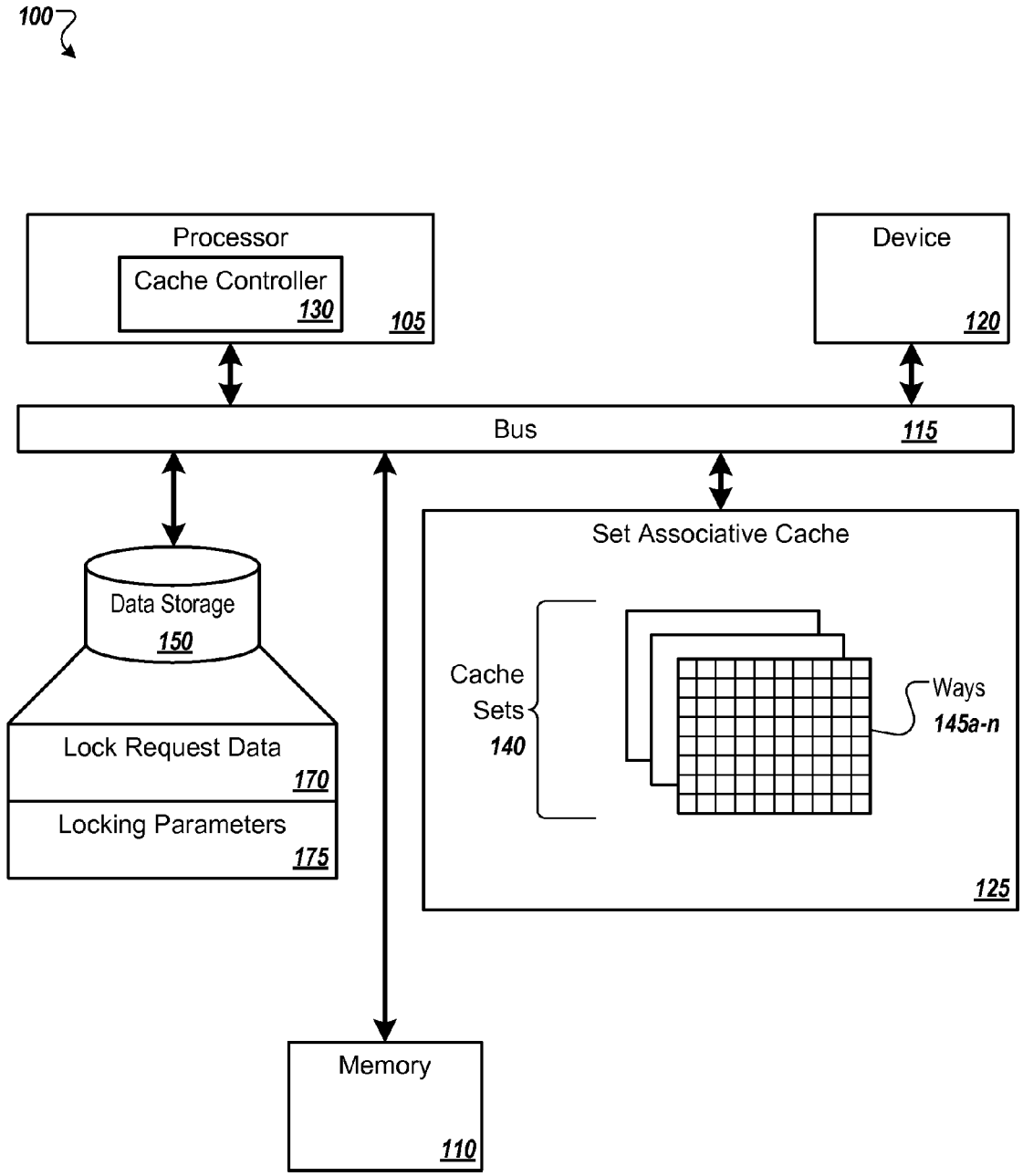
FIG. 1A illustrates a block diagram illustrating an example system architecture for cache locking according to some embodiments.

The present disclosure relates to locking ways in a set-associative cache. A cache may be used reduce an average time to access data from a main memory of a computer system. The cache is typically smaller and faster than main memory. The cache can store copies of the data from frequently used main memory locations. Most central processing units (CPUs) have different independent caches, including instruction and data caches, where the data cache is usually organized as a hierarchy of more cache levels (e.g., L1, L2, L3). In some cases, lower-levels of cache, such as L3, also service requests from I/O devices including graphics/video devices. These are often referred to as "memory-side caches" as they can intercept transactions sent to memory.

Caches can also be configured in different schemes. One such cache configuration scheme is a set-associative cache. An associate scheme works by dividing the cache into multiple equal sections called cache ways. Each cache way is treated like a direct mapped cache for a memory location in the main memory. The cache ways can be grouped into sets to create a set-associative scheme, where each of the sets corresponds to a set of main memory locations. For example, a main memory can have 1000 memory locations and can be divided into four sets. A first set of the main memory locations can include locations 1-250, a second set of the main memory locations can include locations 251-500, and so forth. The set-associative cache can have 200 ways that can be grouped into 4 sets of 50 ways, where each set of ways corresponds to a set of main memory locations. For example, a first set of ways can include 50 ways in which data from any of the first set of the main memory locations (memory locations 1-250) can be stored. In another example, a first set of ways can include 50 ways in which data from any of a set of the main memory locations (e.g., memory locations 1, 5, 9, 13 . . . 993, 997) can be stored.

It is sometimes desirable to lock certain main memory locations into the set-associative cache to ensure that data in these certain memory locations are not evicted to make way for other data. This gives those certain memory locations (or more specifically the system or sub-system address that they represent) an advantage over general memory transactions as they remain present in the cache. Locking these certain memory locations is typically done to improve performance for these memory locations. Some conventional locking mechanisms allow a cache user (e.g., an input-output (IO) device or driver) to request to lock an arbitrary cache location (or small, arbitrarily-placed blocks of locations). In such approaches every way within a set may possibly be locked for the same cache user, leaving no available ways in the set for other users to access or use. Thus, it is desirable to impose restrictions to limit the number of ways that may be locked for a cache user, so as to leave at least a small proportion of the ways of the set for use by other cache users.

Moreover, some conventional approaches to limiting the number of ways that may be locked within a cache have fallen short because an overall limit on the proportion of the cache that can be locked translates into an average number of locked ways across all sets of ways of the cache. In an illustrative example of a conventional set-associative cache that has 8 ways per set, and where a maximum of 37.5% of the cache (an average of 3 ways out of 8) may be allocated to locked addresses, a per-set limit of 6 lockable ways out of 8 may also be imposed. Because conventional approaches use this average number of locked ways, some sets may have 0 locked ways while other sets are likely to have all 6 lockable ways used, which are sometimes referred to as "hot sets." These hot sets, however, have only 2 ways out of 8 available for general use, and there is a high likelihood that parts of the memory that have been assigned to general use cases may map to more than two ways in that set. Thus, with only 2 available ways, the general use case memory often may not fit in to the cache. In situations where there is a significant latency impact when servicing out-of-cache memory locations, the performance impact on the general use case may be significant and these performance drawbacks may outweigh the benefits of allowing hot sets in the cache. Further, the performance decrease may not be linear. For example, when some sets in a cache have only 2 available (e.g., non-locked) ways, the resulting performance may be a fraction of the performance of a cache that has sets that have 4 non-locked ways.

Embodiments of the present disclosure address these and other shortcomings by providing a mechanism for improved cache locking by imposing a locking limit to the number of ways in a cache set that may be locked for a particular cache user. In one embodiment, a cache controller receives a first request from a device (e.g., an input-output (IO) device, software, driver, etc.) to lock a first way in the cache. The cache controller determines that the first way in the cache is not lockable by the device. In some embodiments, the first way is part of a set of ways in the cache and the first way is not lockable because a threshold number of ways within the set have already been locked. The cache controller sends, to the device, a rejection of the first request. The device may then send a second request to lock a second way in the cache. The processor receives the second request from the device and locks the second way in the cache when the second way is lockable. In some embodiments, the second way is lockable when it is part of a second set of ways, where the threshold number of ways within the second set have not been locked. By permitting ways to be locked on a per-set basis, embodiments of the present disclosure permit cache locking with overall system performance in mind. In some embodiments, the cache controller may dynamically change the threshold such that the second request may be accepted even if the second request is for a way that is part of the first set of ways.

FIG. 1A illustrates a block diagram illustrating an example system architecture 100 to control cache locking, in accordance with some embodiments. The system architecture 100 includes a processor 105 coupled to a memory 110 via a bus 115. The system architecture 100 also includes a device 120 (e.g., an IO device) and a cache 125 that are coupled to the bus 115.

Processor 105 may be any type of processor, including a general purpose microprocessor, such as a processor in the Intel® Pentium® Processor Family, Intel® Xeon® Processor Family, Intel® Core™ Processor Family, or other processor family from Intel® Corporation, or another processor from another company, or a special purpose processor or microcontroller. Processor 105 may include multiple threads and multiple execution cores, in any combination. In one embodiment, the processor 105 is integrated in a single integrated circuit die having multiple hardware functional units (hereafter referred to as a multi-core system). The multi-core system may be a multi-core processor package, but may include other types of functional units than just processor cores. Functional hardware units may be processor cores, digital signal processors (DSP), image signal processors (ISP), graphics cores (also referred to as graphics units), voltage regulator (VR) phases, input/output (I/O) interfaces (e.g., serial links, DDR memory channels) and their controllers, network controllers, fabric controllers, or any combination thereof.

Memory 110 includes any type of persistent or non-volatile media, such as a flash memory device, a solid-state device (SSD), a memristor, phase change memory (e.g., PCS, PCM, PCME, PCRAM, Ovonic Unified Memory, Chalcogenide RAM, C-RAM, etc.), or other storage or memory device. Memory 110 stores instructions and/or data represented by data signals that are to be interpreted and/or executed by the processor 105. The processor 105 is coupled to the memory 110 via bus 115. In some embodiments, the memory 110 is a dual-inline memory module (DIMM). Memory 110 may also include volatile memory, such as in the form of random access memory (RAM) or registers.

Figure 1B:
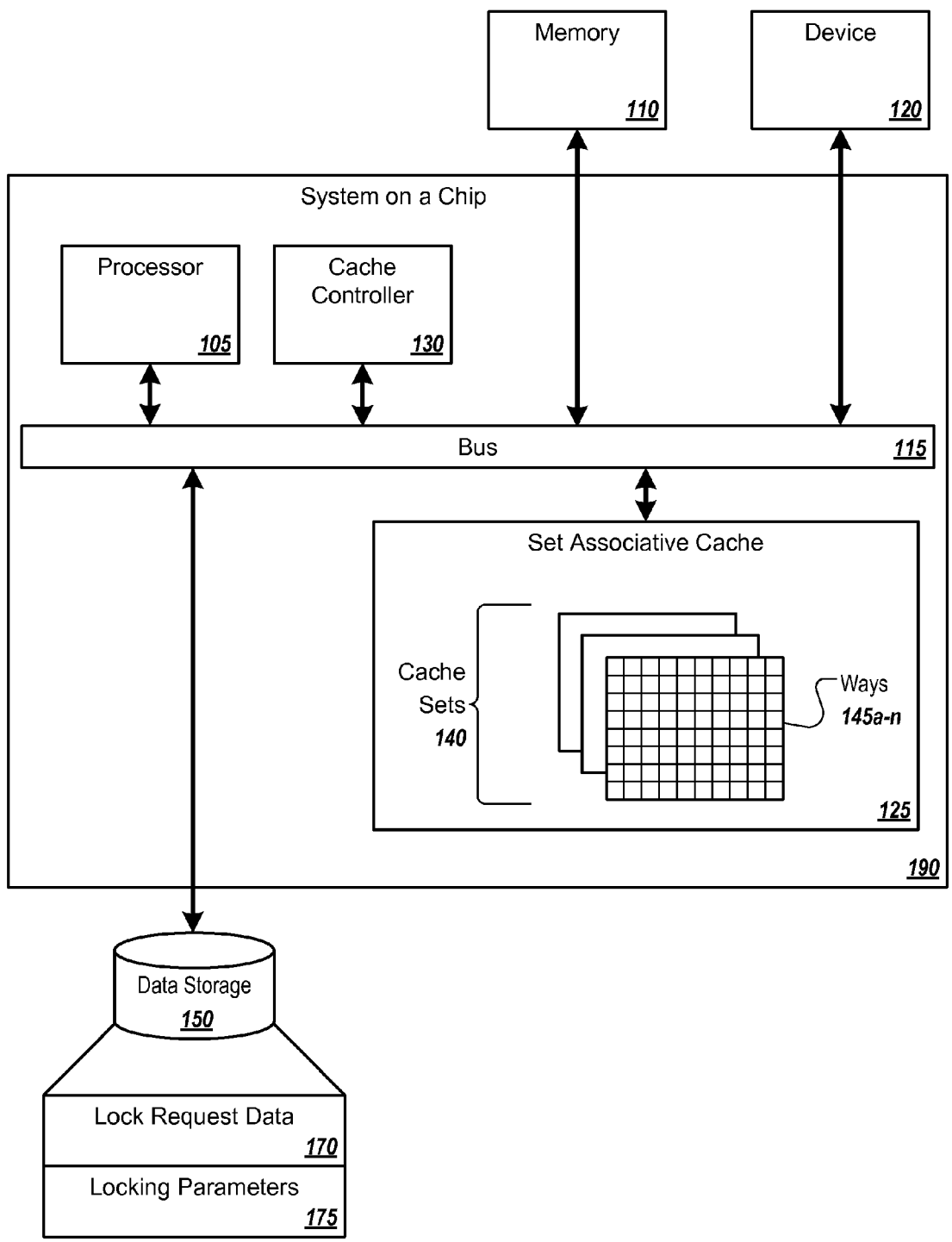
FIG. 1B illustrates a block diagram illustrating an example system on a chip to control cache locking according to some embodiments.

The device 120 may be a device (e.g., an input-output (IO) device), a driver belonging to an IO device, or software program capable of accessing (e.g., reading from, writing to) the memory 110. When the device is a driver, the driver may be running on the processor 105 even though the driver belongs to an IO device. An example of the device 120 may include a graphics device or graphics driver. The device 120 may receive or be assigned a memory address, multiple memory addresses, a block of memory address, or multiple blocks of memory addresses (hereafter referred to collectively as "an address"). For example, an operating system (not shown) may assign the device 120 an address to use during operation. Alternatively, the device 120 may arbitrarily select an address from a list of available memory addresses. During operation, the device 120 may send a request to the cache controller 130 to lock a memory address. When the memory address is not lockable, the device 120 may receive a rejection to the lock request from the processor 105. A characteristic of the device 120 is its ability to receive and interpret a rejection to the lock request. In some embodiments, upon receiving a rejection to a lock request, the device 120 can send another request to lock a different address to the processor 105, as further described herein. The device 120 may share the same circuit board as the processor. Alternatively, the device is external to the processor and is operatively coupled to the processer via bus 115. The device 120 (e.g., IO device) may also be integrated with the processor 105 as part of a system-on-a-chip (SoC), as illustrated in FIG. 1B.

The cache 125 transparently stores data according to the instruction of the cache controller such that future requests for that data can be provided faster. Data stored in a cache can be unique values that have been computed earlier or duplicates of original values that are stored elsewhere, such as in the memory 110. If requested data is in the cache, this request can be handled by reading the cache, which is comparatively faster than reading far-memory (e.g., memory 110). Otherwise the requested data is fetched from its original storage location. Thus, requests that can be handled using the cache 125 are typically faster than for data that is not in the cache. The cache 125 shown may represent one or more levels of cache within one or more cores, a set of one or more shared cache units and external memory 110. The set of shared cache units may include one or more mid-level caches, such as level 2 (L2), level 3 (L3), level 4 (L4), or other levels of cache, a last level cache (LLC), and/or combinations thereof. Any number of cache configurations and cache sizes are contemplated. Depending on the architecture, the cache 125 may be a single internal cache located on an integrated circuit or may be multiple levels of internal caches on the integrated circuit. For configurations with multiple cache levels, the caches can be configured to be inclusive or non-inclusive. Other embodiments include a combination of both internal and external caches depending on particular embodiments. In one embodiment, the cache 125 is located physically closer to the processor 105 than the memory 110 to take advantage of spatial aspects of the principle of locality. Though one cache is shown in FIG. 1A, additional caches may be co-located or located elsewhere with the system architecture 100.

The cache 125 can be a set-associative cache and can include one or more cache ways 145a-n. Each cache way 145a-n can include an address to actual data fetched from a main memory (e.g., a tag), and a data block (e.g., a cache line that contains data fetched from the main memory). Some or all of the ways 145 in the cache sets 140 are lockable. In some embodiments, a specific number of ways 145 within a set 140 are lockable for a device 120 using a lock limit, as described herein. In some embodiments, a specific number of ways 145 within a set 140 are lockable for a single requesting agent (e.g., device 120), a group of requesting agents, or overall for the cache 125.

The system architecture 100 includes a cache controller 130 to manage operations at the cache 125. As illustrated, the cache controller 130 may be part of the processor 105 and the data storage 150 is shown as a separate entity. In some embodiments, the processor 105, cache controller 130 and the data storage 150 may be combined with a set-associative cache 125 to form a cache. The cache controller 130 is configured to receive lock requests from a device such as the processor 105 or IO device 120. For example, the lock request may be a request to lock a cache way, or a specific memory address or block of memory addresses associated with the cache way. The cache controller 130 determines whether to lock a way in the cache in response to the lock request. When a threshold number of ways in a given set have been locked for the device 120 (e.g., when the number of ways locked for the set is equal to a lock limit), the cache controller 130 can deny the lock request and issue a rejection to the device 120. The device 120 can then send a second lock request for a different address to the cache controller 130. The cache controller 130 can again determine whether to lock a way in the cache in response to the second lock request. When a threshold number of ways in a given set are not locked for the device 120 (e.g., when the number of ways locked for the set is less than a lock limit), the cache controller 130 can grant the lock request, lock the corresponding way in the cache 125, and issue a request granted message to the device 120.

The cache controller 130 can store a lock request data 170 and locking parameters 175 in a data storage 150. The lock request data 170 can include a number of lock requests received from the particular device 120, a number of lock request rejections issued for to the device, a number of consecutive successful lock requests, a number of consecutive rejected lock requests, and any other data related to receiving, processing and rejecting lock requests from any number of devices. The locking parameters 175 can include the lock limit. The cache controller 130 can unlock ways during regular system operation in response to a request from the device 120, for example, when the device 120 has finished a particular operation.

The cache controller 130 can use the lock request data 170 to adjust the locking parameters 175. For example, the cache controller 130 can increase or decrease the lock limit. Based on the lock request data 170. When a first threshold number of lock requests from the device 120 are rejected, the cache controller 130 can increase the lock limit such that the device 120 may lock more ways within a given set. Increasing the lock limit permits the device 120 to lock more ways in the cache, which can result in increased performance for the device 120 with a potential decrease in performance for other devices attempting to use the cache 125. When a second threshold number of lock requests from the device 120 are granted, the cache controller 130 can decrease the lock limit such that the device 120 may lock fewer ways within a given set. When the second threshold number of granted lock requests is met (e.g., when a grant counter exceed the threshold number), the cache controller 130 may determine that the device 120 does not need as many lockable ways in the cache 125 in the set as are currently permitted under the lock limit. Thus, a decrease in the lock limit may not adversely affect performance of the device 120, while potentially improving performance for other cache users.

In some embodiments, the cache controller 130 receives a request to lock an address from the device 120 and determines that the way that corresponds to the address is not lockable for the device. Instead of rejecting the lock request, the cache controller 130 can lock the way of the cache and send, to the device 120, a recommendation to cancel (or decline) the lock and then send a second request to lock a second address. If the device 120 sends the second request, the cache controller 130 can unlock the way locked under the first request (e.g., automatically) and then determine if a way in the cache that corresponds to the second address is lockable for the device 120. The cache controller 130 and device 130 can continue in this manner until the device 120 determines a way that is lockable by the device 120, after which the cache controller 130 cause the way to be locked.

The lock limit may be dynamically adjusted using many different methods and techniques. In any method or technique, the lock limit may range between 1 and the cache's true limit, M, where, if W is the number of ways per set, M<W. The lock limit may generally be applied in a shared manner to all IO and processor devices capable of issuing lock requests. However, some embodiments may substitute or add a lock limit that is applied per-device or per group of devices, in which case, the lower limit may include zero.

In one embodiment, the cache controller 130 maintains the lock limit in proportion to an amount of cache ways that have already been locked. To do so, the cache controller 130 may use a round algorithm such as "L=Round(Maximum(M, 1+(F*(W*U))))," where L is the lock limit, F represents a fraction of the cache that contains locked ways, and U is a value greater than 1 that represents an allowance for unevenness. The "round" function is to round the value to the nearest whole number, which the cache controller 130 sets as the lock limit. In a specific example, W=8, U=1.25 and M=6. When the cache has no or few locked ways, the algorithm will output L=1. Once the cache has more than 5% of locked ways, L will increase to 2. At 15% locked ways, L will increase to 3. At 25% locked ways, L=4, and so forth. Once the cache has 45% or more locked entries, the maximum permitted value of L=M (which is 6), will be reached, and will not be exceeded. When ways in the cache are unlocked, the number L will be reduced accordingly.

Another embodiment uses a similar algorithm as in the above embodiment, and also includes hysteresis. In other words, in this embodiment, the output (L) is influenced by current input as well as a history of past inputs. For example, using the same algorithm from above to create a new output Q: "Q=Round (Maximum (M, 1+(F*(W*U))))," the embodiment also uses the algorithm "If Q>L then make L=Q; If Q<(L−2) then make L=Q+2." With such an algorithm, L increases Q as Q increases, and will track Q+2 as Q decreases.

In another embodiment, the lock limit is calculated using an algorithm based on the number of locked ways X in the last n sets visited. In one embodiment, the last n sets were visited during a locking operation. Alternatively, the last n sets visited were visited during any cache operation. The algorithm to calculate the lock limit in this embodiment is as follows: L=maximum (M, round(average(X-1, X-2, X-3 . . . X-n)+A), where A is an addition factor. In some embodiments, the addition factor is 1 or 2.

In another embodiment, the lock limit is determined using a randomizing factor in addition to using to one or more algorithm described herein to create a new lock limit (L'). In this embodiment, the cache controller 130 can use a function random( ) to create a random non-integer value between 0 and 1. The random, non-integer value can be used in the following algorithm to determine L': L'=Round(Maximum(M, 2*L*random( ).

In a further embodiment, the cache controller 130 may determine the lock limit with an override mechanism where, in addition to using any of the algorithms described herein, if three successive lock requests are rejected, the cache controller 130 may set the lock limit to be equal to M until a lock request succeeds.

Any aspect of the algorithms described herein, or other algorithms, may be combined to determine the lock limit. In some embodiments, the output from multiple algorithms is used to determine the lock limit. For example, multiple lock limits that were calculated using different algorithms may be combined, such as by using a minimum, maximum, median or averaging function. In some embodiments, the cache controller 130 randomly selects from multiple possible algorithms when determining the lock limit. In some embodiments, the cache controller 130 may heuristicly select an algorithm to use to determine the lock limit.

In an example of operation, the cache 125 can be used to hold data pertaining to a system address range that is 24 bits (16 MByte) in size. The cache 125 can have 256 cache sets 140, where each set can include 8 ways per cache set 140 and each way can hold 256 contiguous bytes of data that share common system address bits [23:8] and differ in system address bits [7:0]. Each cache set 140 can be associated with a different value, such as the 256 possible permutations of the upper 8 address bits of the system address, bits [23:16]. Any cache set 140 can hold eight different ways. Each way can be 256 bytes. For example, a way 145 can be associated with addresses ranging from 0xXXYY00 to 0xXXYYFF. Any address represented by the hexadecimal value: 0xXXYYZZ can be placed or locked into cache set 0xYY. This example cache 125, which has 256 sets, each of 8 ways, and each holding 256 bytes of data has a total capacity of 512Kbytes of data, which is ⅟₃₂ of the size of the system memory.

In an example, a USB controller (e.g., device 120) is associated with the following six 256-byte blocks of addresses:
0x103000-0x1030FF
0x103100-0x1031FF
0x103200-0x1032FF
0x113100-0x1131FF
0x223100-0x2231FF
0x223400-0x2234FF An imaging processing software running on the processor 105 also be associated with the following six blocks of addresses:
0x503100-0x5031FF
0x513100-0x5131FF
0x523100-0x5231FF
0x533100-0x5331FF
0x543100-0x5431FF
0x553100-0x5531FF Of the six 256-byte blocks of addresses, the USB controller 120 is to use five for high-speed data transfer and one for a rarely used process log. Thus, the USB controller's driver sends a request to the cache controller 130 to lock the five blocks of addresses for high-speed data transfer into the cache 125.

With a conventional cache, the USB controller 120 requests to lock the following five blocks of addresses:
0x103000-0x1030FF
0x103100-0x1031FF
0x103200-0x1032FF
0x113100-0x1131FF
0x223100-0x2231FF Notice that, the USB controller 120 is requesting to lock three addresses in set 0x31, which have been underlined above for illustrative purposes. The USB controller 120 will use the block of addresses 0x223400-0x2234FF for its process log.

Next, during operation of the image processing software, it is impossible for all of the six software ways (listed above, starting 0x5) to be held in cache 125 because, of the eight ways of set 0x31, three of them have already been locked for use by the USB controller 120. Conventional cache operation will be constantly thrashing, attempting to keep the most recent five of those six blocks of addresses in the cache, resulting in fetches and evictions of image processing software between the cache 125 and memory 110, and potentially causing a significant performance loss for the image processing software.

Under the embodiments described herein, the cache initially has no locked entries. According to the method of determining the lock limit as described in conjunction with FIG. 4, the lock limit will be 2. As above, the USB controller 120 requests to lock the following five blocks of addresses:
0x103000-0x1030FF
0x103100-0x1031FF
0x103200-0x1032FF
0x113100-0x1131FF
0x223100-0x2231FF The requests for the first four blocks of addresses will be granted and the request to lock the last block of addresses, 0x223100-0x2231FF would be rejected because it would result in locking of a third way of set 0x31, which is not permitted under the lock limit of 2, which allows only two ways to be locked in any set. The cache controller 130 then increments a rejection counter from 0 to 1 and stores the updated rejection counter as the lock request data 170.

The USB controller 120 then sends a second request to lock a fifth block of addresses (0x223400-0x2234FF) into the cache for high-speed operation. Because the second request is not for a way in set 0x31 (it is for set 0x34), the cache controller 130 grants the lock request. The cache controller 130 may then increment a grant counter and/or decrement the rejection counter from 1 to 0 and store the updated rejection counter as the lock request data 170.

The USB controller 120 now has five ways locked into cache 125 (one in set 0x30, two in set 0x31, one in set 0x32, and one in set 0x34), one of which was locked as a result of a lock request being rejected and the USB controller 120 requesting to lock a different way.

Thus, 2 ways 145 of a possible 8 have been locked into cache set 0x31 for the USB controller 120. This leaves another 6 ways in cache set 0x31 available for general cache operation. The image processing software will generally have all six of its ways listed above held (not necessarily locked) in the cache 125, providing full performance for the image processing software. In some embodiments, the USB controller 120 process log may be held in cache set 0x31, but it will generally be swapped out to memory 110 to make room for the image processing software, should the image processing software need to use a way in cache set 0x31.

In a further example, the USB controller 120 is associated with six ways—the first 5 ways listed above but the sixth way is: 0x993100-0x9931FF, which also falls within the cache set 0x31. Should the USB controller 120 request to lock that sixth way, the cache controller 130 would reject the request because it falls within the cache set 0x31 and two ways have already been locked for the USB controller 120 in cache set 0x31. The USB controller 120 has not been assigned any further blocks of addresses, and thus all remaining unlocked blocks associated with the USB controller 120 fall within the cache set 0x31. Thus, the USB controller 120 may continue to request to lock the sixth way and the cache controller 130 may continue to reject each lock request. Each time the cache controller 130 rejects a request, the cache controller 130 may increment the rejection counter. Once the rejection counter reaches a rejection threshold, the cache controller 130 may determine that the lock limit needs to be increased to accommodate the demands USB controller 120. A subsequent request to lock the way 0x993100-0x9931FF into the cache will be granted by the cache controller 130.

As the USB controller 120 has repeated failures in its attempts to lock ways in a set, the cache controller 130 can dynamically ease the lock limit. Irrespective of whether the USB controller attempts to lock a new way or re-attempts to lock previous ways, the eased lock limit will result in the USB controller 120 eventually being able to lock pages that otherwise would have failed.

Likewise, whether, due to a new (less problematic) way(s) being associated with the USB controller 120, or whether due to some ways being released (unlocked) by the USB controller 120 or other devices from the cache, if the cache controller 130 grants a series of successful locking requests, the rejection counter will be decremented to zero and then the lock limit will be decremented, with the capability returning the cache to its initial restrictive state where the lock limit is 2. For example, the cache controller 130 increments a grant counter each time it grants a lock request for the USB controller 120. When the grant counter exceeds a grant threshold, the rejection counter and/or the lock limit can be decreased.

FIG. 1B illustrates a block diagram illustrating an example system on a chip (SoC) 190 to control cache locking, in accordance with some embodiments. SoC 190 includes an integrated circuit that comprises the processor 105, the cache 125 and the cache controller 130 (each from FIG. 1A). As illustrated, the memory 110, device 120 (e.g., IO device) and data storage 150 are operatively coupled to the SoC 190. In some embodiments, at least one of the memory 110, device 120 and data storage 150 are also disposed on the SoC 190.

Figure 2A:
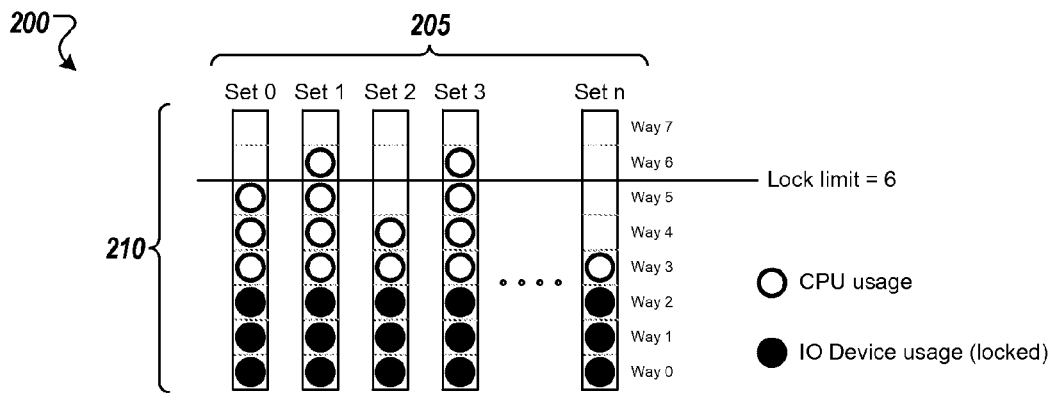
FIGS. 2A-C illustrates a block diagram illustrating a set-associative cache with a dynamic locking limit according to some embodiments.
Figure 2B:
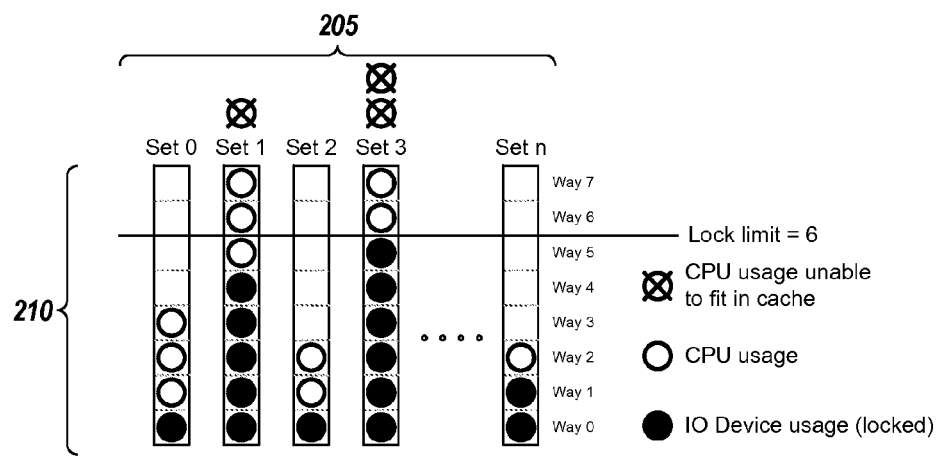
Figure 2C:
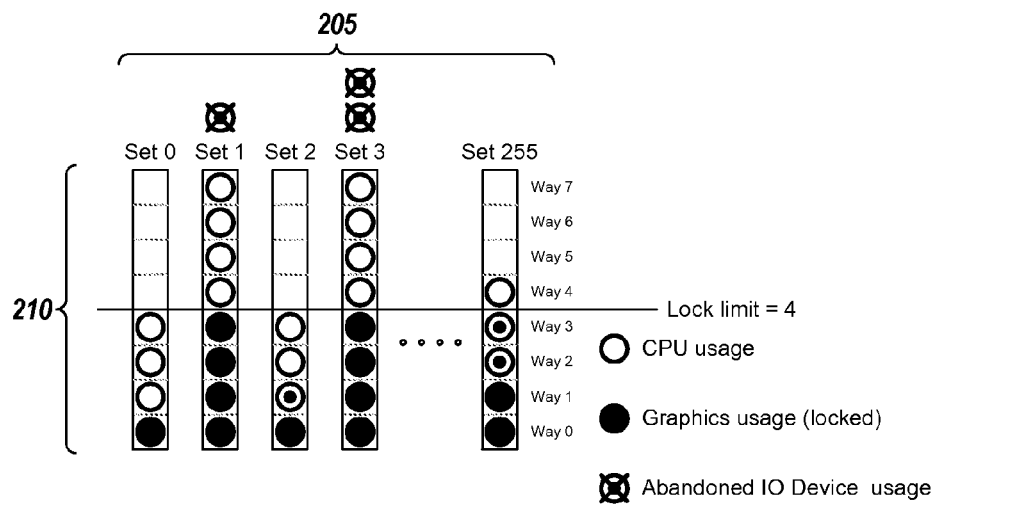

FIGS. 2A-C illustrate a diagrammatic representation of a set-associative cache 200, in accordance with some embodiments. The set-associative cache 200 can be the set-associative cache 125 of FIG. 1A and can be controlled by the cache controller 130 of FIG. 1A. The set-associative cache 200 includes any number of sets 205 of ways (e.g., sets 0-n). Each set 205 may include any number of ways 210. As illustrated, each set 205 includes 8 ways 210 (e.g., ways 0-7). Any number of the ways 210 in each set 205 may be locked. As illustrated and for ease in explanation, a lock limit of 6 has been implemented, which means that 6 ways of the 8 in each set are permitted to be locked. The lock limit of 6 is illustrated by the horizontal line between ways 5 and 6.

Referring to FIG. 2A, 37.5% of the cache 200 has been locked for a device (such as device 120 of FIG. 1) in a uniform manner. For example, the device has requested to lock a large contiguous address block, which results in the locking of 3 ways 210 (e.g., ways 0-2) in each set 205. There is no significance in this being shown as ways 0-2. For example, in a system that has not been freshly initialized, ways 2, 4, and 7 may be selected in set 2 and ways 2, 3, and 5 may be selected in set 3. These still fall well within the limit of "no more than three locked ways per set." For clarity in explanation and illustration, the locked ways are shown occupying the lowest-numbered ways, with other ways in use shown stacked on top. Ways locked by the device are represented by black dots. Another device, such as a processor (e.g., processor 105 of FIG. 1) or another device is performing operations that use the ways in the cache. For purposes of illustration, the other device is represented as a central processing unit (CPU). Usage by the CPU varies between 1 and 4 ways per set. Ways used by the CPU are represented by white dots. The CPU's use of the ways within each set is contained completely within the cache and CPU performance may not decrease as a result of the locks for the device.

Referring to FIG. 2B, although 37.5% of the cache 200 has been locked for the device, the ways that have been locked for the device have not been locked in a uniform manner. For example, 1 way in set 0 has been locked, 5 ways in set 1 have been locked, 6 ways in set 3 have been locked and 2 ways in set n have been locked. This uneven distribution may be due to arbitrary addresses, for example, having been assigned to the device by an operating system. This may be due to many factors that may affect the OS or algorithm used to assign blocks of addresses to the device.

Although the ways reserved for the device in sets 1 and 3 did not exceed the lock limit of 6, the reservation of the ways for the device in sets 1 and 3 has rendered those sets insufficient to hold data for the CPU. For example, the CPU is to use 4 ways in set 1, but is unable since the device has already used 5 of the 8 total ways. The CPU usage that is unable to fit in the cache is represented by the circles with 'x' symbols inside. Similarly, the CPU is to use 4 ways in set 3 but there are only 2 available ways. In the aggregate, three lots of CPU data will be unable to be held in the cache 200, causing thrash. Without being able to use the cache, the CPU may need to use a next level storage that is further away from the CPU. This can negatively impact CPU performance, particularly if the latency to the next level storage where this data would be stored is large.

Referring to FIG. 2C, a lock limit of 4 has been set such that a maximum of 4 ways in each set may be locked for the device. As illustrated, the cache controller has rejected three of the lock requests of the device, as illustrated by the symbol that includes a circle, an 'x' and a square. The device may abandon those lock requests that were rejected by the cache controller. The device may then request to lock three replacement addresses in lieu of the three lock requests that were rejected by the cache controller. As illustrated, the replacement addresses were associated with different ways that still had ways available for locking by the device. Had the device requested to lock replacement ways that would have fallen in sets that had already reached the maximum, these requests would also have been rejected, triggering further attempts. The cache controller successfully locks three replacement ways in other of the sets 205, as illustrated by the double circle symbol. As a result, no set 205 has more than four ways locked, and the CPU usage can be contained within the cache. With the CPU being able to use the cache, the CPU performance of FIG. 2C is similar to that of FIG. 2A despite the address allocation to the device being non-uniform.

Figure 3:
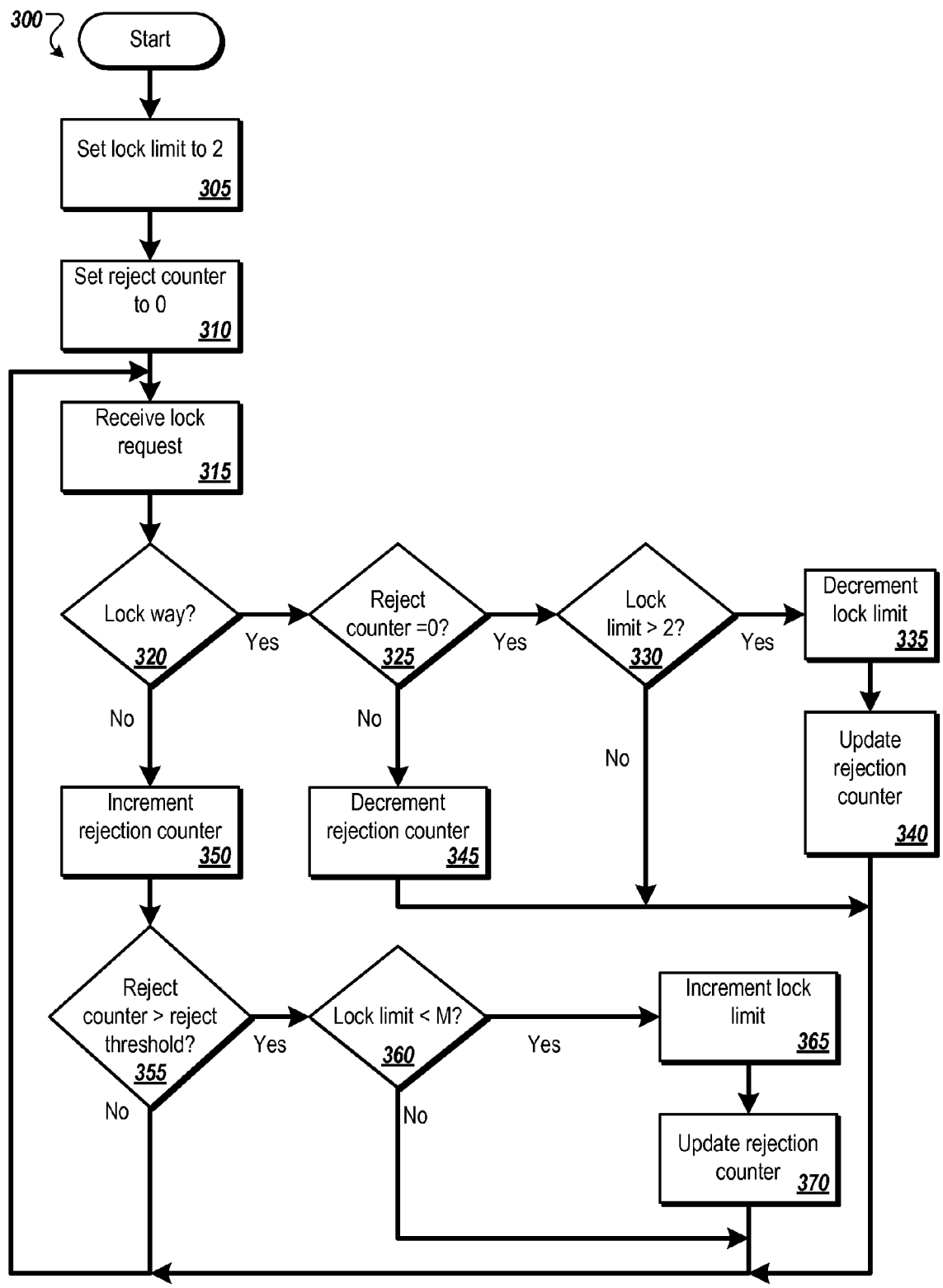
FIG. 3 illustrates a method for dynamically adjusting a locking limit according to some embodiments.

FIG. 3 illustrates a method 300 for dynamically adjusting a locking limit according to some embodiments. The cache may be configured such that up to maximum number ("M") of ways per set may be locked for a given device. Method 300 may be performed by processing logic that may comprise hardware (e.g., circuitry, dedicated logic, programmable logic, microcode, etc.), software (such as operations being performed by a functional unit), firmware or a combination thereof. In some embodiments, method 300 is performed by a processor 105 and/or by a cache controller 130 of FIG. 1. Alternatively, other components of the system architecture 100 may perform some or all of the operations of the method 300. The method 300 may be applied per-device, per processor, per groups of the above (including a mix) and overall for all entities using the cache controller.

Referring to FIG. 3, the method 300 begins at block 305 where the processing logic sets a lock limit to an initial value "X." For example, the initial value can be 2. The lock limit represents a threshold number of ways to lock per a set of ways in a set-associative cache. The lock limit may be dynamic, depending on cache heuristics, as described herein. In some embodiments, the lock limit is set to a stricter (smaller number) limit on the number of ways per set that may be locked. In some embodiments, the lock limit ranges between 2 and that cache's maximum limit. For example, the lock limit for an 8-way set associative cache may be set to 4.

At block 310, the processing logic sets a reject counter to 0. The reject counter may loosely represent a balance between the number of times the cache controller has rejected a lock request from a device (e.g., an IO device or a processor) and the number of times the cache controller has accepted a lock request.

At block 315, the processing logic receives a lock request from the device. The lock request can include a request to lock a specific address or a block of addresses for use by the device. The address or block of addresses can be generated by the device. Alternatively, the device may receive the address or block or addresses from an address assignment source. For example, an operating system of a computing device may assign an address or block of addresses to the device. The addresses can be any address. For block addresses, the addresses can be consecutive.

At block 320, the processing logic determines whether to lock a way in a set-associative cache in association with the lock request. The processing logic can identify an address associated with the lock request and then determine a corresponding way in the cache. The processing logic can also identify a set to which the way belongs. The processing logic can then determine a number of ways in the set that are locked for the device. When the number of ways in the set that are locked for the device is equal to the lock limit, the processing logic rejects the lock request. When the number of ways in the set that are locked for the device is less than the lock limit, the processing logic grants the lock request and causes the way to be locked for the device. The processing logic can send an indication of the decision to grant or deny the lock request to the device.

In response to granting the lock request at block 320, the processing logic determines whether the rejection counter is equal to 0 at block 325. When the rejection counter is not zero, the rejection counter decrements the rejection counter at block 345. When the rejection counter is 0, the processing logic determines whether the lock limit is greater than 2 (2 being the minimum lock limit in this example). When the lock limit is greater than 2, the lock limit may be decremented at block 335. In this manner, the lock limit is dynamic and may decrease when the rejection counter is 0, which may indicate to the processing logic that the device does not need as many ways as are available under the current lock limit (e.g., in a system where a number of ways have been recently unlocked, or in response to requests from devices that have a larger pool of address blocks from which to request). Thus, when the rejection counter is 0, the lock limit may be decreased to accommodate other devices that may use the cache. At block 340, the rejection counter can optionally be set to a number greater than 0. By setting the rejection counter to a number greater than 0, the processing logic can prevent the lock limit from being decremented too soon at block 335. For example, if the rejection counter were to remain at 0 (i.e., by not performing block 340), if the processing logic were to receive and grant another lock request, the lock limit would be decremented again.

In response to rejecting the lock request at block 320, the processing logic increments the rejection counter at block 350. The processing logic can also send, to the device, an indication that the lock request has been rejected. At block 355, the processing logic determines whether the rejection counter is greater than the rejection threshold. The rejection threshold can be a number that is hardcoded. Alternatively, the rejection threshold can be defined by a system administrator. When the processing logic determines at block 355 that the rejection counter is greater than a rejection threshold, the processing logic proceeds to block 360 to determine whether the lock limit is less than the maximum number ("M") of ways per set may be locked for the device. When the lock limit is not less than "M," the processing logic refrains from increasing the lock limit. When the lock limit is less than "M," the processing logic increments the lock limit at block 365. In this manner, the lock limit may be dynamically increased to handle a complex device that is using more ways than a simpler device or to respond to systems where an increasing number of locks are requested. At block 370, the processing logic updates the rejection counter in a similar manner as described in conjunction with respect to block 340.

The above method describes one embodiment to more evenly distribute locked cache ways through a cache. As described, the rejection counter may be used to keep track of the ratio of successes to failures of recent lock requests. Where there has been a string of lock requests that did not succeed (due to the cache rejecting them as they would have led to a greater number of ways being locked in the requested set than permitted under the lock limit), this embodiment includes increasing the lock limit. Conversely, where there has been a string of lock requests that have succeeded, this embodiment includes decrease the lock limit. Overall, the effect is to selectively balance the number of rejected lock requests that will encourage the requesting device to request to lock addresses that are more evenly distributed throughout the cache instead of all being in the same set against the effort involved for these additional requests and the limits of alternate addresses available to the device. Many other algorithms could be applied.

Figure 4:
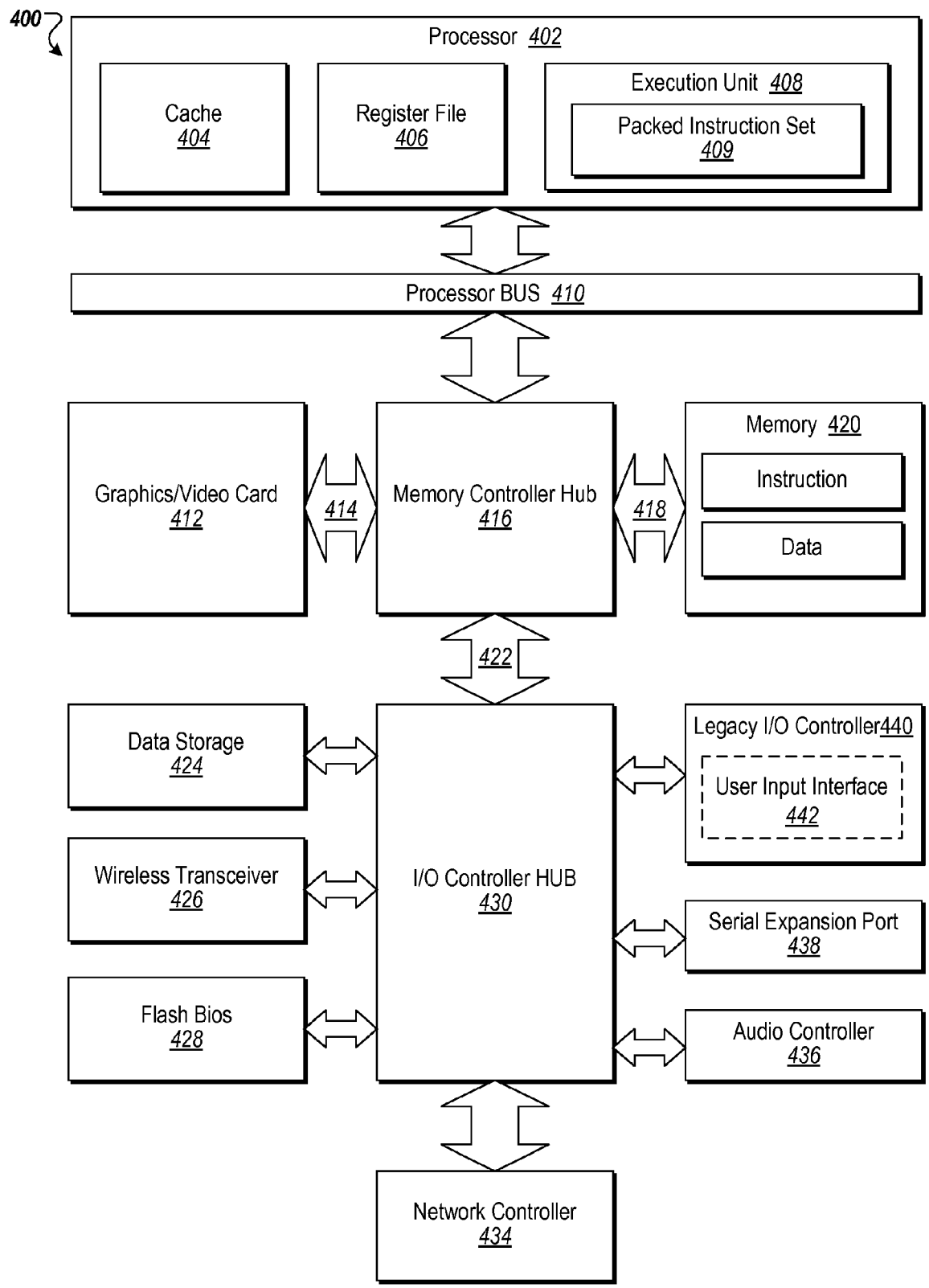
FIG. 4 is a block diagram of an exemplary computer system according to some embodiments.

Turning to FIG. 4, a block diagram of an example computer system formed with a processor that includes execution units to execute an instruction, where one or more of the interconnects implement one or more features in accordance with one embodiment of the present disclosure is illustrated. System 400 includes a component, such as a processor 402 to employ execution units including logic to perform algorithms for processing data, in accordance with the embodiment described herein. Embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 402 includes one or more execution units 408 to implement an algorithm that is to perform at least one instruction. One embodiment may be described in the context of a single processor desktop or server system, but alternative embodiments may be included in a multiprocessor system. System 400 is an example of a 'hub' system architecture. The computer system 400 includes a processor 402 to process data signals. The processor 402, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 402 is coupled to a processor bus 410 that transmits data signals between the processor 402 and other components in the system 400. The elements of system 400 (e.g. graphics accelerator 412, memory controller hub 416, memory 420, I/O controller hub 424, wireless transceiver 426, Flash BIOS 428, Network controller 434, Audio controller 436, Serial expansion port 438, I/O controller 430, etc.) perform their conventional functions that are well known to those familiar with the art.

In one embodiment, the processor 402 includes a Level 1 (L1) internal cache memory 404. Depending on the architecture, the processor 402 may have a single internal cache or multiple levels of internal caches. Other embodiments include a combination of both internal and external caches depending on the particular implementation and needs. One or more of these caches may be set-associative and may allow address locking. As such, it may include an embodiment of the invention whereby the cache controller implements the principles of locking and unlocking cache ways, as described herein. Register file 406 is to store different types of data in various registers including integer registers, floating point registers, vector registers, banked registers, shadow registers, checkpoint registers, status registers, and instruction pointer register.

Execution unit 408, including logic to perform integer and floating point operations, also resides in the processor 402. The processor 402, in one embodiment, includes a microcode (ucode) ROM to store microcode, which when executed, is to perform algorithms for certain macroinstructions or handle complex scenarios. Here, microcode is potentially updateable to handle logic bugs/fixes for processor 402. For one embodiment, execution unit 408 includes logic to handle a packed instruction set 409. By including the packed instruction set 409 in the instruction set of a general-purpose processor 402, along with associated circuitry to execute the instructions, the operations used by many multimedia applications may be performed using packed data in a general-purpose processor 402. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 408 may also be used in micro controllers, embedded processors, graphics devices, DSPs, and other types of logic circuits. System 400 includes a memory 420. Memory 420 includes a dynamic random access memory (DRAM) device, a static random access memory (SRAM) device, flash memory device, or other memory device. Memory 420 stores instructions and/or data represented by data signals that are to be executed by the processor 402.

A system logic chip 416 is coupled to the processor bus 410 and memory 420. The system logic chip 416 in the illustrated embodiment is a memory controller hub (MCH). The processor 402 can communicate to the MCH 416 via a processor bus 410. The MCH 416 provides a high bandwidth memory path 418 to memory 420 for instruction and data storage and for storage of graphics commands, data and textures. The MCH 416 is to direct data signals between the processor 402, memory 420, and other components in the system 400 and to bridge the data signals between processor bus 410, memory 420, and system I/O 422. In some embodiments, the system logic chip 416 can provide a graphics port for coupling to a graphics controller 412. The MCH 416 is coupled to memory 420 through a memory interface 418. The graphics card 412 is coupled to the MCH 416 through an Accelerated Graphics Port (AGP) interconnect 414. A cache may also be implemented in the Memory Controller Hub 416 to provide a faster response than memory 420. This cache may be set-associative and may allow the locking of addresses, as described herein.

System 400 can use a proprietary hub interface bus 422 to couple the MCH 416 to the I/O controller hub (ICH) 430. The ICH 430 provides direct connections to some I/O devices via a local I/O bus. The local I/O bus is a high-speed I/O bus for connecting peripherals to the memory 420, chipset, and processor 402. Some examples are the audio controller, firmware hub (flash BIOS) 428, wireless transceiver 426, data storage 424, legacy I/O controller containing user input and keyboard interfaces, a serial expansion port such as Universal Serial Bus (USB), and a network controller 434. The data storage device 424 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 5:
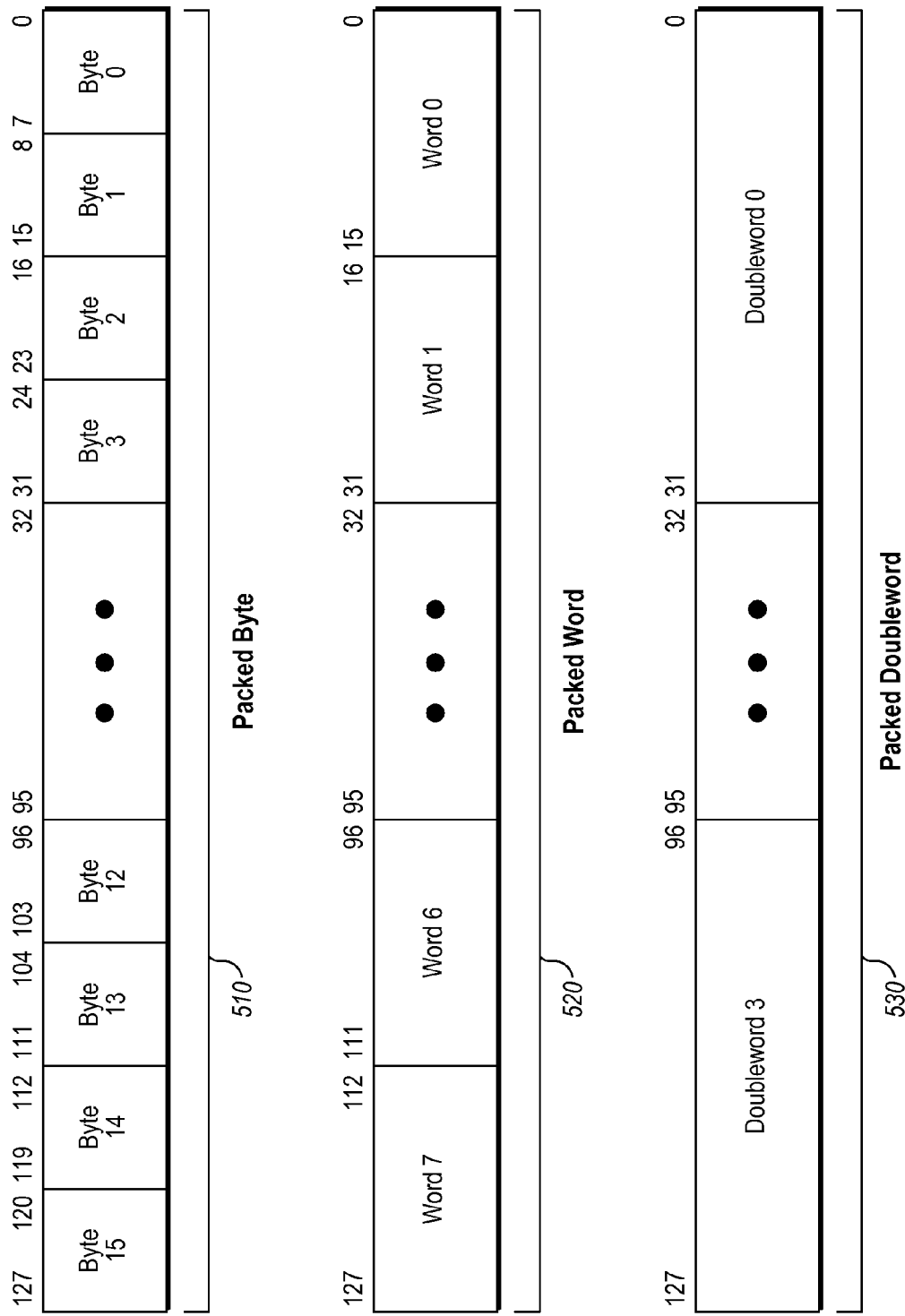
FIG. 5 illustrates packed data types according to some embodiments.

FIG. 5 illustrates various packed data type representations in multimedia registers according to one embodiment of the present disclosure. FIG. 5 illustrates data types for a packed byte 510, a packed word 520, and a packed doubleword (dword) 530 for 128 bits wide operands. The packed byte format 510 of this example is 128 bits long and contains sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a single register or memory location with other data elements of the same length. In packed data sequences relating to SSEx technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 5 are 128 bit long, embodiments can also operate with 64 bit wide or other sized operands. The packed word format 520 of this example is 128 bits long and contains eight packed word data elements. Each packed word contains sixteen bits of information. The packed doubleword format 530 of FIG. 5 is 128 bits long and contains four packed doubleword data elements. Each packed doubleword data element contains thirty two bits of information. A packed quadword is 128 bits long and contains two packed quad-word data elements.

FIG. 6A is a block diagram illustrating an in-order pipeline and a register renaming stage, out-of-order issue/execution pipeline according to at least one embodiment of the disclosure. FIG. 6B is a block diagram illustrating an in-order architecture core and a register renaming logic, out-of-order issue/execution logic to be included in a processor according to at least one embodiment of the disclosure. The solid lined boxes in FIG. 6A illustrate the in-order pipeline, while the dashed lined boxes illustrates the register renaming, out-of-order issue/execution pipeline. Similarly, the solid lined boxes in FIG. 6B illustrate the in-order architecture logic, while the dashed lined boxes illustrates the register renaming logic and out-of-order issue/execution logic.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

In FIG. 6B, arrows denote a coupling between two or more units and the direction of the arrow indicates a direction of data flow between those units. FIG. 6B shows processor core 690 including a front end unit 630 coupled to an execution engine unit 650, and both are coupled to a memory unit 670.

The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to a level 2 (L2) cache unit 676 in the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 162 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The L2 cache unit 676 is coupled to one or more other levels of cache and eventually to a main memory. The L2 cache unit 676 may be set associative and may allow the locking of addresses, as described herein.

By way of example, the register renaming, out-of-order issue/execution core architecture may implement the pipeline 500 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618;

7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

While register renaming is described in the context of out-of-order execution, it should be understood that register renaming may be used in an in-order architecture. While the illustrated embodiment of the processor also includes a separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 7:
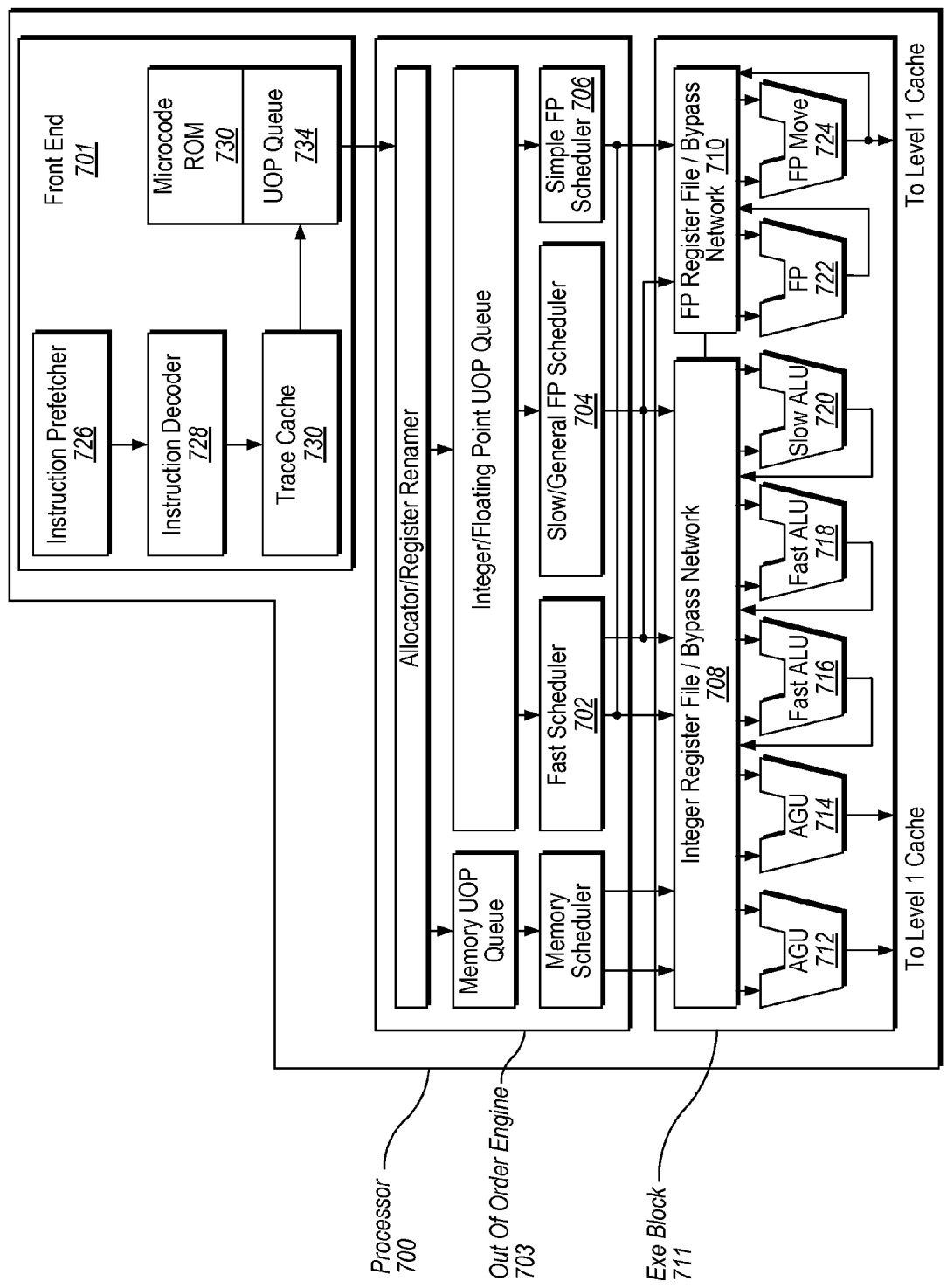
FIG. 7 is a block diagram of a processor according to some embodiments.

FIG. 7 is a block diagram of the micro-architecture for a processor 700 that includes logic circuits to perform instructions in accordance with one embodiment of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline. The front end 701 may include several units. In one embodiment, the instruction prefetcher 726 fetches instructions from memory and feeds them to an instruction decoder 728 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 728 accesses the microcode ROM 732 to do the instruction. For one embodiment, an instruction can be decoded into a small number of micro ops for processing at the instruction decoder 728. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706 determine when a uop is ready to execute based on the readiness of their dependent input register operand sources and the availability of the execution resources the uops need to complete their operation. The fast scheduler 702 of one embodiment can schedule on each half of the main clock cycle while the other schedulers can schedule once per main processor clock cycle. The schedulers arbitrate for the dispatch ports to schedule uops for execution.

Register files 708, 710 sit between the schedulers 702, 704, 706, and the execution units 712, 714, 716, 718, 720, 722, 724 in the execution block 711. There is a separate register file 708, 710 for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 722 of one embodiment includes a 64 bit by 64 bit floating point divider to execute divide, square root, and remainder micro-ops. For embodiments of the present disclosure, instructions involving a floating point value may be handled with the floating point hardware. In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720 are described in the context of performing integer operations on 64 bit data operands. In alternative embodiments, the ALUs 716, 718, 720 can be implemented to support a variety of data bits including 16, 32, 128, 756, etc. Similarly, the floating point units 722, 724 can be implemented to support a range of operands having bits of various widths. For one embodiment, the floating point units 722, 724 can operate on 128 bits wide packed data operands in conjunction with SIMD and multimedia instructions.

In one embodiment, the uops schedulers 702, 704, 706 dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
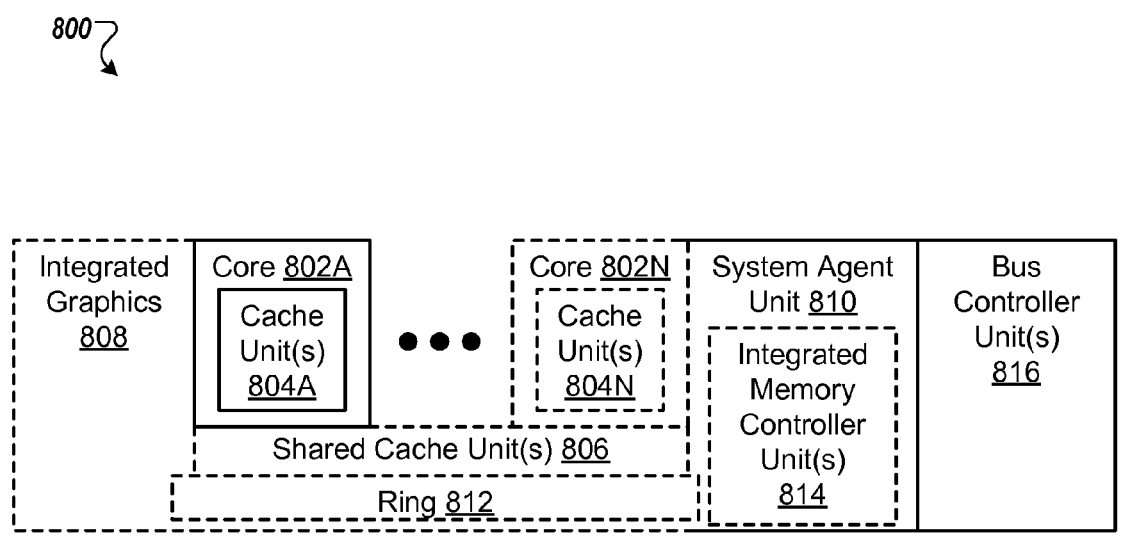
FIG. 8 is a block diagram of a processor according to some embodiments.

FIG. 8 is a block diagram of a single core processor and a multicore processor 800 with integrated memory controller and graphics according to embodiments of the disclosure. The solid lined boxes in FIG. 8 illustrate a processor 800 with a single core 802A, a system agent 810, a set of one or more bus controller units 816, while the addition of the dashed lined boxes illustrates an alternative processor 800 with multiple cores 802A-N, a set of one or more integrated memory controller unit(s) 814 in the system agent unit 810, and an integrated graphics logic 808.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. This set of shared cache units 806 may be set associative and may allow the locking of addresses, as described herein. While in one embodiment a ring based interconnect unit 812 interconnects the integrated graphics logic 808, the set of shared cache units 806, and the system agent unit 810, alternative embodiments may use any number of well-known techniques for interconnecting such units.

In some embodiments, one or more of the cores 802A-N are capable of multithreading.

The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture and/or instruction set. For example, some of the cores 802A-N may be in order while others are out-of-order. As another example, two or more of the cores 802A-N may be capable of execution the same instruction set, while others may be capable of executing a subset of that instruction set or a different instruction set. As a further example, the cores can be different architecture.

The processor may include one or more different general-purpose processors, such as a Core™ i3, i5, i7, 2 Duo and Quad, Xeon™, Itanium™, Atom™, XScale™ or StrongARM™ processor, which are available from Intel Corporation, of Santa Clara, Calif. For example, one core can be a Core i7™ core while another core of the processor can be an Atom™ core. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 800 may be a part of and/or may be implemented on one or more substrates using any of a number of process technologies, such as, for example, BiCMOS, CMOS, or NMOS.

Figure 9:
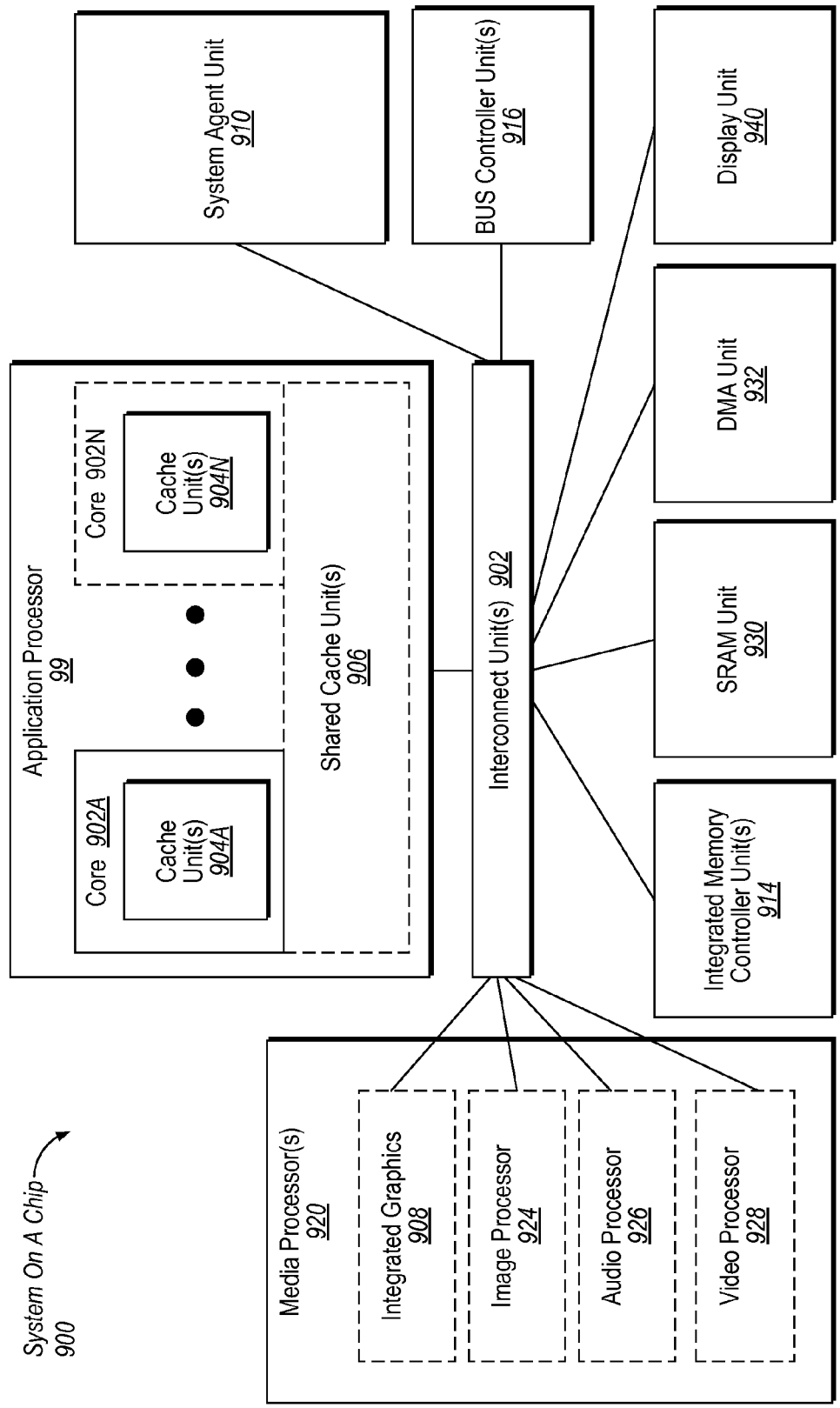
FIG. 9 is a block diagram of a system-on-a-chip according to some embodiments.

Referring now to FIG. 9, shown is a block diagram of a SoC 900 in accordance with an embodiment of the present disclosure. Similar elements in FIG. 9 bear like reference numerals. Also, dashed lined boxes are features on more advanced SoCs. In FIG. 9, an interconnect unit(s) 902 is coupled to: an application processor 910 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
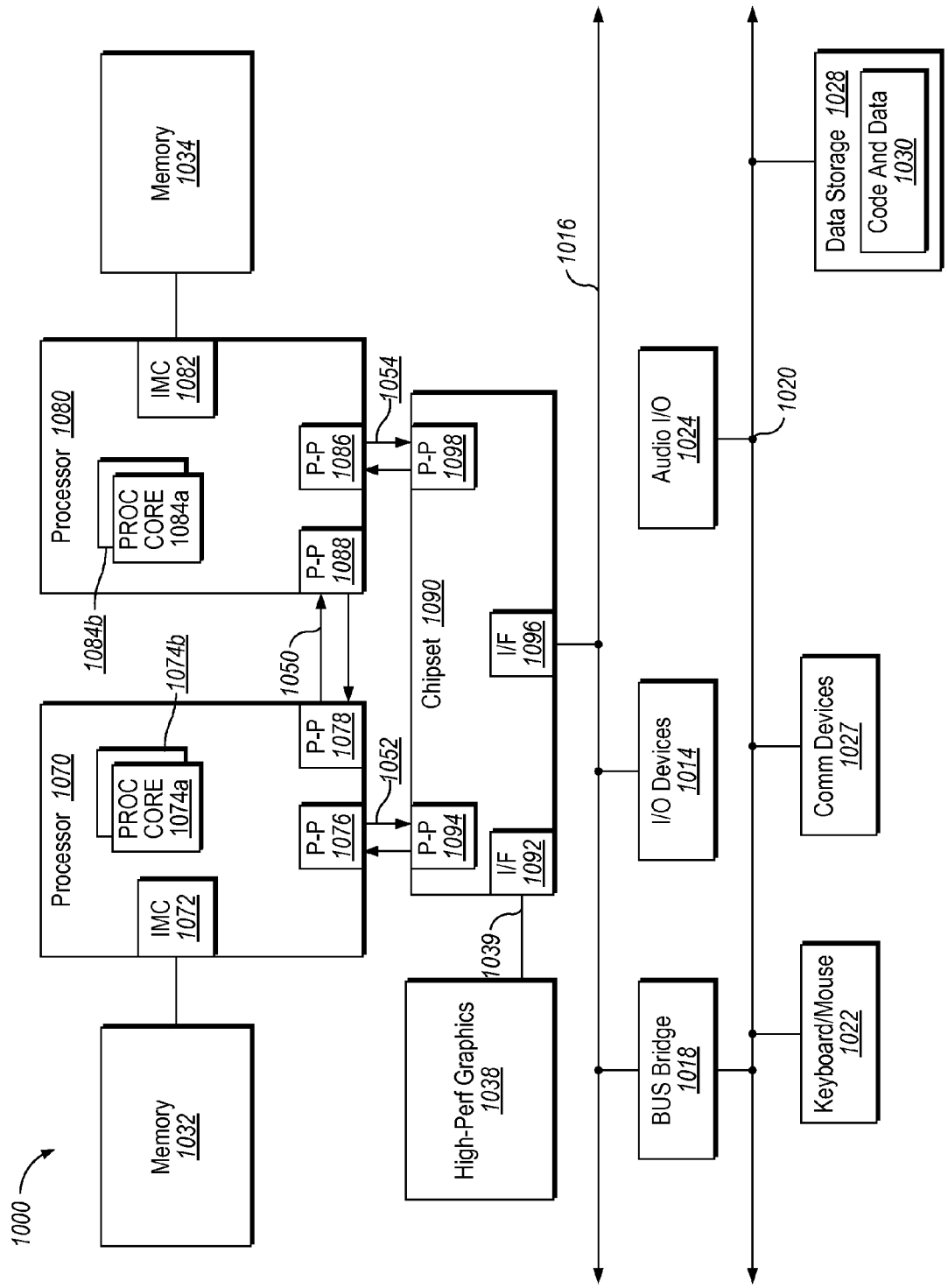
FIG. 10 is a block diagram of a computer system according to some embodiments.

Embodiments may be implemented in many different system types. Referring now to FIG. 10, shown is a block diagram of a multiprocessor system 1000 in accordance with some embodiments. As shown in FIG. 10, multiprocessor system 1000 is a point-to-point interconnect system, and includes a first processor 1070 and a second processor 1080 coupled via a point-to-point interconnect 1050. As shown in FIG. 10, each of processors 1070 and 1080 may be multicore processors, including first and second processor cores (i.e., processor cores 1074a and 1074b and processor cores 1084a and 1084b), although potentially many more cores may be present in the processors. The processors each may include hybrid write mode logics in accordance with an embodiment of the present.

While shown with two processors 1070, 1080, it is to be understood that the scope of the present disclosure is not so limited. In other embodiments, one or more additional processors may be present in a given processor.

Processors 1070 and 1080 are shown including integrated memory controller units 8102 and 8102, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may also exchange information with a high-performance graphics circuit 1038 via a high-performance graphics interface 1039.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present disclosure is not so limited.

As shown in FIG. 10, various I/O devices 1014 may be coupled to first bus 1016, along with a bus bridge 1018 which couples first bus 1016 to a second bus 1020. In one embodiment, second bus 1020 may be a low pin count (LPC) bus. Various devices may be coupled to second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to second bus 1020. Note that other architectures are possible. For example, instead of the point-to-point architecture of FIG. 10, a system may implement a multi-drop bus or other such architecture.

Figure 11:
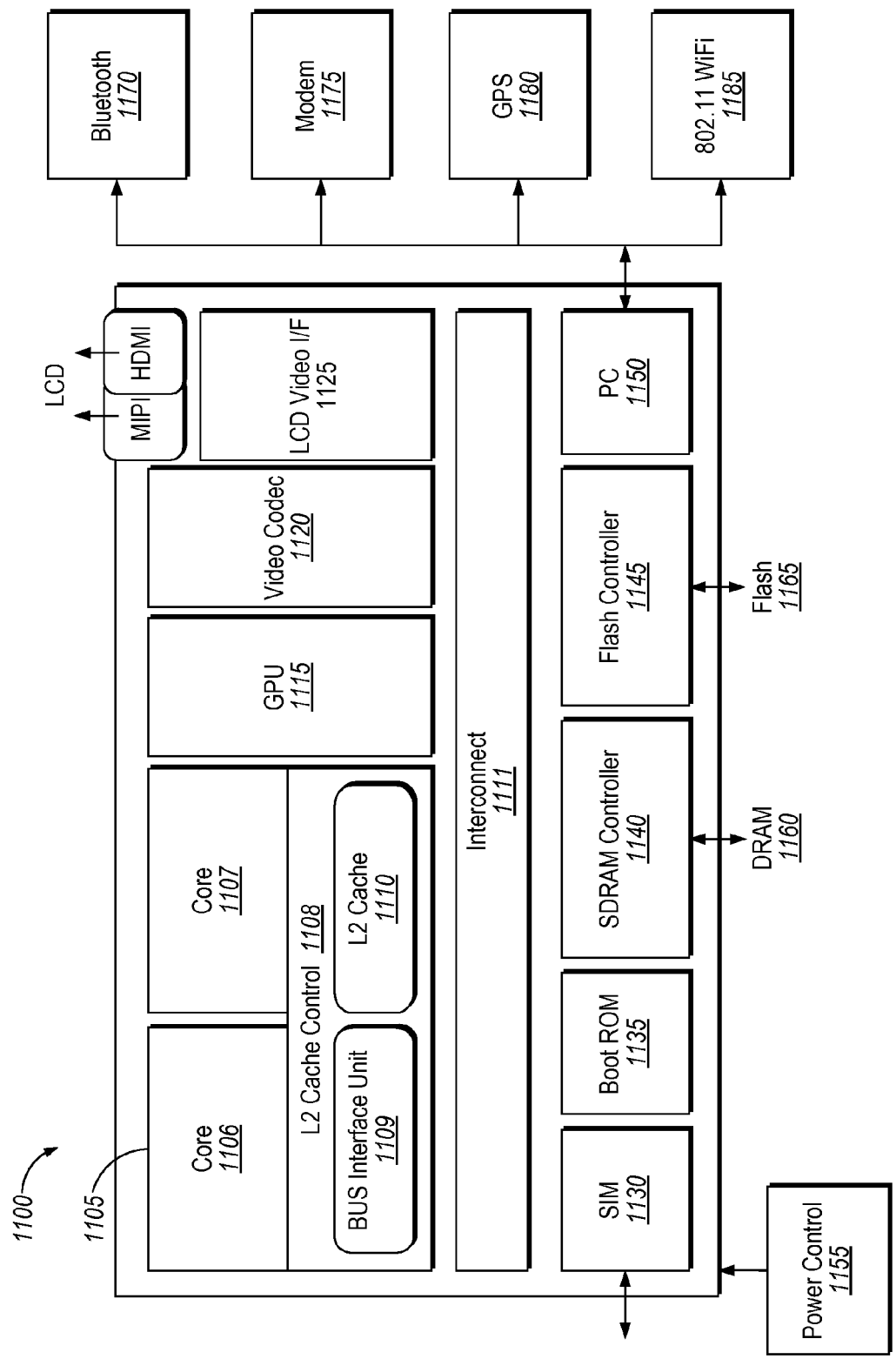
FIG. 11 illustrates another example block diagram for a computing system according to some embodiments.

Turning next to FIG. 11, an embodiment of a system on-chip (SOC) design in accordance with embodiments of the disclosure is depicted. As an illustrative example, SOC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network.

Here, SOC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot rom 1135 to hold boot code for execution by cores 1106 and 1107 to initialize and boot SOC 1100, a SDRAM controller 1140 to interface with external memory (e.g. DRAM 1160), a flash controller 1145 to interface with persistent or non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, modem 1175 (e.g., 3G, 4G, Long Term Evolution (LTE), LTE-Advanced, etc.), GPS 1180, Wi-Fi 1185, Zigbee (not shown), and Z-Wave (not shown). Note as stated above, a UE includes a radio for communication. As a result, these peripheral communication modules may not all be included. However, in a UE some form of a radio for external communication should be included.

Figure 12:
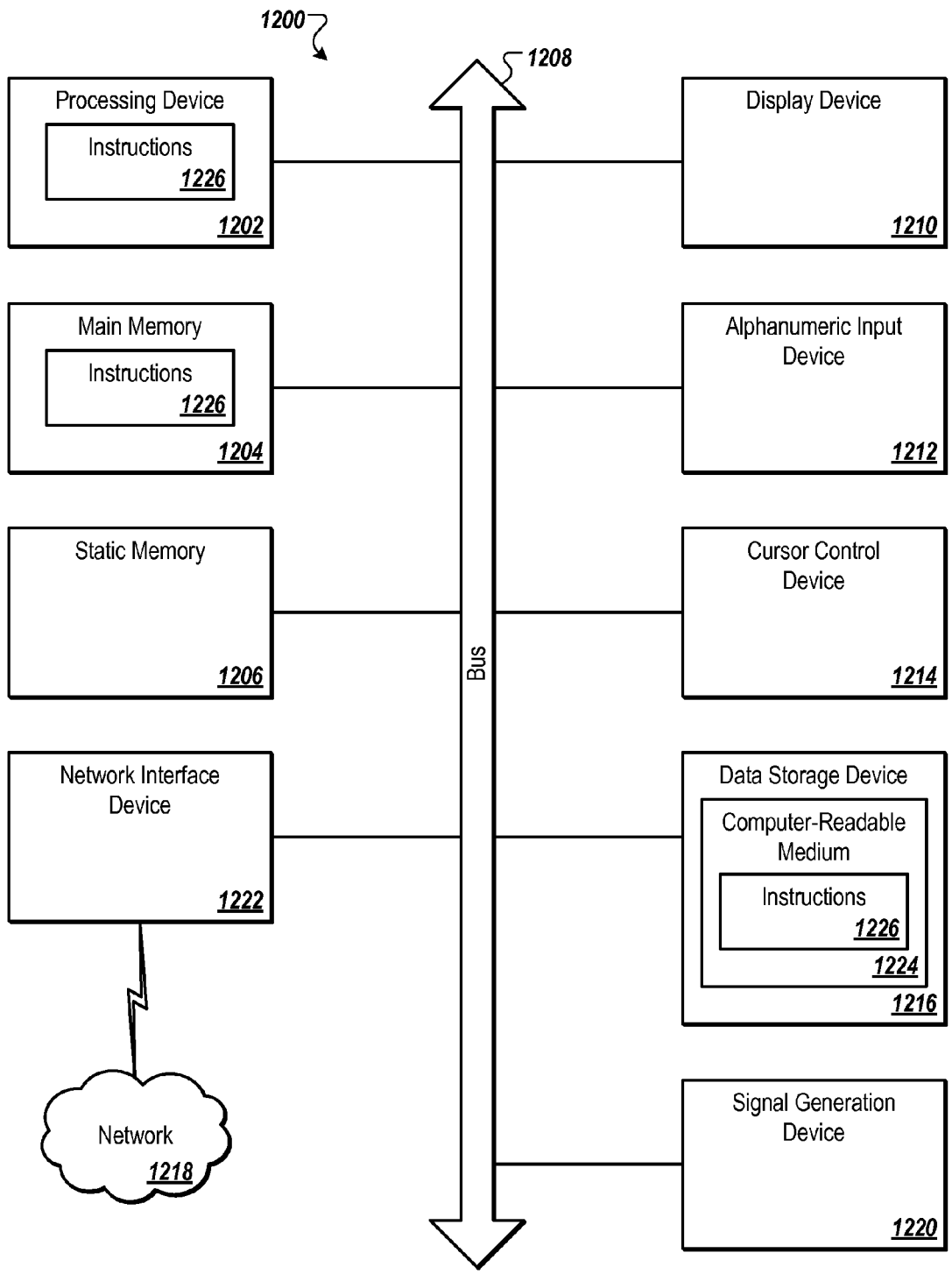
FIG. 12 illustrates a diagrammatic representation of a machine in the example form of a computing system according to some embodiments.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a game console, a cellular telephone, a digital camera, a handheld PC, a web appliance, a server, a network router, switch or bridge, micro controller, a digital signal processor (DSP), system on a chip, network computers (NetPC), network hubs, wide area network (WAN) switches, or any machine capable of executing a set of instructions (sequential or otherwise) that specify actions to be taken by that machine. Further, while only a single machine is illustrated for the system architecture 100, the term "machine" shall also be taken to include any collection of machines that individually or jointly execute a set (or multiple sets) of instructions to perform any one or more of the methodologies discussed herein. Embodiments are not limited to computer systems.

The computing system 1200 includes a processing device 1202, main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1216, which communicate with each other via a bus 1208.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations discussed herein. In one embodiment, processing device 1202 can be part of the system architecture 100 of FIG. 1A or SoC 190 of FIG. 1B. Alternatively, the computing system 1200 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Computing system 1200 is representative of processing systems based on the PENTIUM III™, PENTIUM 4™, Celeron™, Xeon™, Itanium, XScale™, StrongARM™, Core™, Core 2™, Atom™, and/or Intel® Architecture Core™, such as an i3, i5, i7 microprocessors available from Intel Corporation of Santa Clara, Calif., although other systems (including PCs having other microprocessors, engineering workstations, set-top boxes and the like) may also be used. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. In one embodiment, processing device 1202 executes a version of the WINDOWS™ operating system available from Microsoft Corporation of Redmond, Wash., although other operating systems (OS X, UNIX, Linux, Android, iOS, Symbian, for example), embedded software, and/or graphical user interfaces, may also be used. Thus, embodiments of the present disclosure are not limited to any specific combination of hardware circuitry and software. One embodiment may be described in the context of a single processor desktop or server system, but alternative embodiments may be included in a multiprocessor system. Computing system 1200 may be an example of a 'hub' system architecture.

The computing system 1200 may further include a network interface device 1222 communicably coupled to a network 1218. The computing system 1200 also may include a display device 1210 (e.g., a liquid crystal display (LCD) or a cathode ray tube (CRT)), an alphanumeric input device 1212 (e.g., a keyboard), a cursor control device 1214 (e.g., a mouse), a signal generation device 1220 (e.g., a speaker), or other peripheral devices. Furthermore, computing system 1200 may include a graphics processing unit (not illustrated), a video processing unit (not illustrated) and an audio processing unit (not illustrated). In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1216 may include a computer-readable storage medium 1224 on which is stored instructions 1226 embodying any one or more of the methodologies of functions described herein. The instructions 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 utilizing the processing device 1202, such as described with respect to FIG. 1A, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to hybrid-threading in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Hexadecimal values may also be represented with a prefix, such as "0x." Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present specification, a detailed description has been given with reference to specific example embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The following examples pertain to further embodiments.

Example 1 is an integrated circuit including a cache controller, the cache controller to receive a first request from a device to lock a first address that corresponds to a first way in a cache, determine that the first way in the cache is not lockable for the device, send, to the device, a rejection of the first request, receive a second request from the device to lock a second address that corresponds to a second way in a cache, and lock the second way in the cache in response to the second request.

In Example 2, the subject matter of Example 1, where the cache is a set-associative cache that that includes a plurality of lockable ways that each correspond to a set of memory addresses, where the plurality of lockable ways that includes the first way and the second way.

In Example 3, the subject matter of any one of Examples 1-2, where the set-associative cache that includes a plurality of sets of ways, where a first set of ways that includes the first way and where a second set of ways that includes the second way.

In Example 4, the subject matter of any one of Examples 1-3, the cache controller further to determine a lock limit to indicate a maximum number of lockable ways for each of the plurality of lockable ways that may be locked for the device.

In Example 5, the subject matter of any one of Examples 1-4, where the lock limit is a same dynamically adjustable value for each of the plurality of sets of ways.

In Example 6, the subject matter of any one of Examples 1-5, the cache controller further to increment a reject counter in response to determining that the first way in the cache is not lockable for the device.

In Example 7, the subject matter of any one of Examples 1-6, the cache controller further to determine that the reject counter is above a rejection threshold in response to sending the rejection of the first request, determine that the lock limit is below a maximum lock value, and increment the lock limit.

In Example 8, the subject matter of any one of Examples 1-7, where when locking the second way in the cache in response to the second request, the cache controller is to send a message to the device that indicates that the second request has been granted, and increment a grant counter, where the cache controller is further to decrement the lock limit when the grant counter exceeds a grant threshold.

In Example 9, the subject matter of any one of Examples 1-8, where when sending, to the device, the rejection of the first request, the cache controller is to lock the first way of the cache, where the rejection to the request that includes a recommendation for the device to cancel the lock and to send the second request, and receive an indication from the device to cancel the lock of the first way and the second request.

Example 10 is an integrated circuit including a cache, and a processor coupled to the cache, the processor including a cache controller to receive a first request from an input-output (IO) device to lock a first way in the cache, determine that the first way in the cache is permitted to be locked, lock the first way in the cache in response to the request, decrement a reject counter in response to locking the first way in the cache, and decreasing a lock limit when the reject counter is below a rejection threshold.

In Example 11, the subject matter of Example 10, where the cache is a set-associative cache that that includes a plurality of lockable ways that each correspond to a set of memory addresses, where the plurality of lockable ways that includes the first way and a second way, where the set-associative cache that includes a plurality of sets of ways, where a first set of ways that includes the first way and the second way.

In Example 12, the subject matter of any one of Examples 10-11, the cache controller further to receive a second request from the device to lock the second way in the cache, determine that the second way in the cache is not lockable by the device, send, to the device, a rejection of the second request, and increment a reject counter in response to determining that the second way in the cache is not lockable.

In Example 13, the subject matter of any one of Examples 10-12, where the lock limit is to indicate a maximum number of lockable ways for each of the plurality of lockable ways that may be locked for the device.

Example 14 is a system including a memory device, a peripheral device operatively coupled to the memory device, and a cache controller operatively coupled to the memory device, the cache controller to receive a first request from a device to lock a first address that corresponds to a first way in a cache, determine that the first way in the cache is not lockable for the device, send, to the device, a rejection of the first request, receive a second request from the device to lock a second address that corresponds to a second way in a cache, and lock the second way in the cache in response to the second request.

In Example 15, the subject matter of Example 14, where the cache is a set-associative cache that that includes a plurality of lockable ways that each correspond to a set of memory addresses, where the plurality of lockable ways that includes the first way and the second way.

In Example 16, the subject matter of any one of Examples 14-15, where the set-associative cache that includes a plurality of sets of ways, where a first set of ways that includes the first way and where a second set of ways that includes the second way.

In Example 17, the subject matter of any one of Examples 14-16, the cache controller further to determine a lock limit to indicate a maximum number of lockable ways for each of the plurality of lockable ways that may be locked for the device.

In Example 18, the subject matter of any one of Examples 14-17, where the lock limit is a same dynamically adjustable value for each of the plurality of sets of ways.

In Example 19, the subject matter of any one of Examples 14-18, the cache controller further to increment a reject counter in response to determining that the first way in the cache is not lockable for the device.

In Example 20, the subject matter of any one of Examples 14-19, the cache controller further to determine that the reject counter is above a rejection threshold in response to sending the rejection of the first request, determine that the lock limit is below a maximum lock value, and increment the lock limit.

In Example 21, the subject matter of any one of Examples 14-20, where when locking the second way in the cache in response to the second request, the cache controller is to send a message to the device that indicates that the second request has been granted, and increment a grant counter, where the cache controller is further to decrement the lock limit when the grant counter exceeds a grant threshold.

In Example 22, the subject matter of any one of Examples 14-21, where when sending, to the device, the rejection of the first request, the cache controller is to lock the first way of the cache, where the rejection to the request that includes a recommendation for the device to cancel the lock and to send the second request, and receive an indication from the device to cancel the lock of the first way and the second request.

Example 23 is a method including receiving a first request from a device to lock a first way in a cache, determining, by a cache controller, that the first way in the cache is not lockable by the device, sending, to the device, a rejection of the first request, receiving a second request from the device to lock a second way in the cache, and locking, by the cache controller, the second way in the cache in response to the second request.

In Example 24, the subject matter of Example 23, where the cache is a set-associative cache that that includes a plurality of lockable ways that each correspond to a set of memory addresses, where the plurality of lockable ways that includes the first way and the second way.

In Example 25, the subject matter of any one of Examples 23-24, where the set-associative cache that includes a plurality of sets of ways, where a first set of ways that includes the first way and where a second set of ways that includes the second way.

In Example 26, the subject matter of any one of Examples 23-25 further including determining a lock limit to indicate a maximum number of lockable ways for each of the plurality of lockable ways that may be locked for the device, where the lock limit is a same dynamically adjustable value for each of the plurality of sets of ways.

In Example 27, the subject matter of any one of Examples 23-26 further including incrementing a reject counter in response to determining that the first way in the cache is not lockable.

In Example 28, the subject matter of any one of Examples 23-27 further including determining that the reject counter is above a rejection threshold, determining that the lock limit is below a maximum lock value, and incrementing the lock limit.

In Example 29, the subject matter of any one of Examples 23-28, where sending, to the device, the rejection of the first request that includes locking the first way of the cache, where the rejection to the request that includes a recommendation for the device to decline the lock and to send the second request, and receiving an indication from the device to decline the lock of the first way and the second request.

Example 30 is a machine readable medium including code, when executed, to cause a machine to perform the method of any one of examples 23 to 29.

Example 31 is an apparatus including means for performing the method of any one of examples 23 to 29.

Example 32 is an apparatus including a processor configured to perform the method of any one of examples 23 to 29.

Example 33 is a non-transitory machine-readable storage medium including data that, when accessed by a cache controller, cause the cache controller to perform operations including receiving a first request from a device to lock a first way in a cache, determining, by the cache controller, that the first way in the cache is not lockable by the device, sending, to the device, a rejection of the first request, receiving a second request from the device to lock a second way in the cache, and locking, by the cache controller, the second way in the cache in response to the second request.

In Example 34, the subject matter of Example 33, where the cache is a set-associative cache that that includes a plurality of lockable ways that each correspond to a set of memory addresses, where the plurality of lockable ways that includes the first way and the second way.

In Example 35, the subject matter of any one of Examples 33-34, where the set-associative cache that includes a plurality of sets of ways, where a first set of ways that includes the first way and where a second set of ways that includes the second way.

In Example 36, the subject matter of any one of Examples 33-35, the operations further including determining a lock limit to indicate a maximum number of lockable ways for each of the plurality of lockable ways that may be locked for the device, where the lock limit is a same dynamically adjustable value for each of the plurality of sets of ways.

In Example 37, the subject matter of any one of Examples 33-36, the operations further including incrementing a reject counter in response to determining that the first way in the cache is not lockable.

In Example 38, the subject matter of any one of Examples 33-37, the operations further including determining that the reject counter is above a rejection threshold, determining that the lock limit is below a maximum lock value, and incrementing the lock limit.

In Example 39, the subject matter of any one of Examples 33-38, where sending, to the device, the rejection of the first request that includes locking the first way of the cache, where the rejection to the request that includes a recommendation for the device to decline the lock and to send the second request, and receiving an indication from the device to decline the lock of the first way and the second request.

Example 40 is a machine-readable storage medium including data that, when accessed by a cache controller, cause the cache controller to perform operations including receiving a first request from a device to lock a first way in a cache, determining, by the cache controller, that the first way in the cache is not lockable by the device, sending, to the device, a rejection of the first request, receiving a second request from the device to lock a second way in the cache, and locking, by the cache controller, the second way in the cache in response to the second request.

In Example 41, the subject matter of Example 40, where the cache is a set-associative cache that that includes a plurality of lockable ways that each correspond to a set of memory addresses, where the plurality of lockable ways that includes the first way and the second way.

In Example 42, the subject matter of any one of Examples 40-41, where the set-associative cache that includes a plurality of sets of ways, where a first set of ways that includes the first way and where a second set of ways that includes the second way.

In Example 43, the subject matter of any one of Examples 40-42, the operations further including determining a lock limit to indicate a maximum number of lockable ways for each of the plurality of lockable ways that may be locked for the device, where the lock limit is a same dynamically adjustable value for each of the plurality of sets of ways.

In Example 44, the subject matter of any one of Examples 40-43, the operations further including incrementing a reject counter in response to determining that the first way in the cache is not lockable.

In Example 45, the subject matter of any one of Examples 40-44, the operations further including determining that the reject counter is above a rejection threshold, determining that the lock limit is below a maximum lock value, and incrementing the lock limit.

In Example 46, the subject matter of any one of Examples 40-45, where sending, to the device, the rejection of the first request that includes locking the first way of the cache, where the rejection to the request that includes a recommendation for the device to decline the lock and to send the second request, and receiving an indication from the device to decline the lock of the first way and the second request.

Example 47 is an apparatus including means for receiving a first request from a device to lock a first way in a cache, means for determining, by a cache controller, that the first way in the cache is not lockable by the device, means for sending, to the device, a rejection of the first request, means for receiving a second request from the device to lock a second way in the cache, and means for locking, by the cache controller, the second way in the cache in response to the second request.

In Example 48, the subject matter of Example 47, where the cache is a set-associative cache that that includes a plurality of lockable ways that each correspond to a set of memory addresses, where the plurality of lockable ways that includes the first way and the second way.

In Example 49, the subject matter of any one of Examples 47-48, where the set-associative cache that includes a plurality of sets of ways, where a first set of ways that includes the first way and where a second set of ways that includes the second way.

In Example 50, the subject matter of any one of Examples 47-49 further including means for determining a lock limit to indicate a maximum number of lockable ways for each of the plurality of lockable ways that may be locked for the device, where the lock limit is a same dynamically adjustable value for each of the plurality of sets of ways.

In Example 51, the subject matter of any one of Examples 47-50 further including means for incrementing a reject counter in response to determining that the first way in the cache is not lockable.

In Example 52, the subject matter of any one of Examples 47-51 further including means for determining that the reject counter is above a rejection threshold, means for determining that the lock limit is below a maximum lock value, and means for incrementing the lock limit.

In Example 53, the subject matter of any one of Examples 47-52, where the means for sending, to the device, the rejection of the first request that includes means for locking the first way of the cache, where the rejection to the request that includes a recommendation for the device to decline the lock and to send the second request, and means for receiving an indication from the device to decline the lock of the first way and the second request.

Example 54 is a machine-readable storage including machine-readable instructions, when executed, to implement a method or realize an apparatus as claimed in any preceding claim.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," "monitoring," "calculating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. An integrated circuit comprising a cache controller, the cache controller to:
   receive a first request from a device to lock a first address that corresponds to a first way in a cache;
   determine that the first way in the cache is not lockable for the device;
   send, to the device, a rejection of the first request;
   receive a second request from the device to lock a second address that corresponds to a second way in a cache; and
   lock the second way in the cache in response to the second request.

2. The integrated circuit of claim 1, wherein the cache is a set-associative cache that comprises a plurality of lockable ways that each correspond to a set of memory addresses, wherein the plurality of lockable ways comprises the first way and the second way.

3. The integrated circuit of claim 2, wherein the set-associative cache comprises a plurality of sets of ways, wherein a first set of ways comprises the first way and wherein a second set of ways comprises the second way.

4. The integrated circuit of claim 3, the cache controller further to determine a lock limit to indicate a maximum number of lockable ways for each of the plurality of lockable ways that may be locked for the device.

5. The integrated circuit of claim 4, wherein the lock limit is a same dynamically adjustable value for each of the plurality of sets of ways.

6. The integrated circuit of claim 4, the cache controller further to increment a reject counter in response to determining that the first way in the cache is not lockable for the device.

7. The integrated circuit of claim 6, the cache controller further to:
   determine that the reject counter is above a rejection threshold in response to sending the rejection of the first request;
   determine that the lock limit is below a maximum lock value; and
   increment the lock limit.

8. The integrated circuit of claim 4, wherein when locking the second way in the cache in response to the second request, the cache controller is to:
   send a message to the device that indicates that the second request has been granted; and
   increment a grant counter,
   wherein the cache controller is further to decrement the lock limit when the grant counter exceeds a grant threshold.

9. The integrated circuit of claim 1, wherein when sending, to the device, the rejection of the first request, the cache controller is to:
   lock the first way of the cache, wherein the rejection to the request comprises a recommendation for the device to cancel the lock and to send the second request; and
   receive an indication from the device to cancel the lock of the first way and the second request.

10. An integrated circuit comprising:
    a cache; and
    a processor coupled to the cache, the processor comprising a cache controller to:
       receive a first request from an input-output (IO) device to lock a first way in the cache;
       determine that the first way in the cache can be locked;
       lock the first way in the cache in response to the request;
       decrement a reject counter in response to locking the first way in the cache; and decreasing a lock limit when the reject counter is below a rejection threshold.

11. The integrated circuit of claim 10, wherein the cache is a set-associative cache that comprises a plurality of lockable ways that each correspond to a set of memory addresses, wherein the plurality of lockable ways comprises the first way and a second way, wherein the set-associative cache comprises a plurality of sets of ways, wherein a first set of ways comprises the first way and the second way.

12. The integrated circuit of claim 11, the cache controller further to:
receive a second request from the device to lock the second way in the cache;
determine that the second way in the cache is not lockable by the device;
send, to the device, a rejection of the second request; and
increment a reject counter in response to determining that the second way in the cache is not lockable.

13. The integrated circuit of claim 11, wherein the lock limit is to indicate a maximum number of lockable ways for each of the plurality of lockable ways that may be locked for the device.

14. A method comprising:
receiving a first request from a device to lock a first way in a cache;
determining, by a cache controller, that the first way in the cache is not lockable by the device;
sending, to the device, a rejection of the first request;
receiving a second request from the device to lock a second way in the cache; and
locking, by the cache controller, the second way in the cache in response to the second request.

15. The method of claim 14, wherein the cache is a set-associative cache that comprises a plurality of lockable ways that each correspond to a set of memory addresses, wherein the plurality of lockable ways comprises the first way and the second way.

16. The method of claim 15, wherein the set-associative cache comprises a plurality of sets of ways, wherein a first set of ways comprises the first way and wherein a second set of ways comprises the second way.

17. The method of claim 16 further comprising determining a lock limit to indicate a maximum number of lockable ways for each of the plurality of lockable ways that may be locked for the device, wherein the lock limit is a same dynamically adjustable value for each of the plurality of sets of ways.

18. The method of claim 17 further comprising incrementing a reject counter in response to determining that the first way in the cache is not lockable.

19. The method of claim 18 further comprising:
determining that the reject counter is above a rejection threshold;
determining that the lock limit is below a maximum lock value; and
incrementing the lock limit.

20. The method of claim 14, wherein sending, to the device, the rejection of the first request comprises:
locking the first way of the cache, wherein the rejection to the request comprises a recommendation for the device to decline the lock and to send the second request; and
receiving an indication from the device to decline the lock of the first way and the second request.

* * * * *